(12) United States Patent
Secareanu

(10) Patent No.: US 12,192,323 B2
(45) Date of Patent: Jan. 7, 2025

(54) BINARY ENCRYPTION / DECRYPTION METHOD FOR SECURE AUDIO / VIDEO BROADCAST AND COMMUNICATION AND FOR DATA TRANSMISSION / STORAGE

(71) Applicant: Radu Mircea Secareanu, Phoenix, AZ (US)

(72) Inventor: Radu Mircea Secareanu, Phoenix, AZ (US)

(73) Assignee: Radu Mircea Secareanu, Phoenix, AZ (US)

( * ) Notice: Subject to any disclaimer, the term of this patent is extended or adjusted under 35 U.S.C. 154(b) by 318 days.

(21) Appl. No.: 17/573,438

(22) Filed: Jan. 11, 2022

(65) Prior Publication Data
US 2023/0224141 A1    Jul. 13, 2023

(51) Int. Cl.
*H04L 9/06* (2006.01)
*H04L 9/40* (2022.01)

(52) U.S. Cl.
CPC ........ H04L 9/0631 (2013.01); H04L 63/0428 (2013.01)

(58) Field of Classification Search
None
See application file for complete search history.

(56) References Cited

U.S. PATENT DOCUMENTS

| | | | |
|---|---|---|---|
| 2022/0284132 A1* | 9/2022 | Blanton | G06F 21/72 |
| 2022/0303249 A1* | 9/2022 | Imabayashi | H04L 9/008 |
| 2022/0311597 A1* | 9/2022 | Goel | H04L 9/0891 |
| 2023/0099538 A1* | 3/2023 | Manevich | H04L 9/0869 713/156 |
| 2023/0188323 A1* | 6/2023 | Ichikawa | H04L 9/0618 380/28 |
| 2023/0188983 A1* | 6/2023 | Rigelsford | H04L 9/3242 713/168 |

* cited by examiner

*Primary Examiner* — Jeffrey R Swearingen

(57) ABSTRACT

An encryption/decryption method is disclosed, where the input data string is described in term of consecutive groups of alternating same type bits, where one of these groups of same type bits is defined as a preferred group with the other groups having either lower or higher number of same type bits, where the data string is partitioned into variable length processing strings where the variable length is determined by the occurrence of the preferred group or of a determined number of bits consisting of groups of lower number of same type bits, where these variable length processing strings are encrypted function of the configuration and content of each processing string only, where consecutive processing strings are additionally encrypted based on their content only, where further encryption is performed from permutations of select partitions of groups of processing strings only as well as from permutations of select partitions of consecutive processing strings, where all said encryption means creating a total encryption space, where this total encryption space is represented by a multitude of encryption keys, where each of said encryption keys is interpreted using a set of reference data, and where communication between a data sender device and a data receiver device is secured by conforming to device specific settings.

11 Claims, 11 Drawing Sheets

100

011_001_110_000_001_011_101_111_011_111

101  102

103

String 100 description using FB and AB:

106

FB=0

AB structure: 1_2_2_3_6_1_1_3_1_4_1_5

104

String 100 after RB transformation:

FB=0

105

RB transformation:

10_101_001_000_001_110_011_000_110_000

AB structure:

FB: 0
PS_1: 1_2_2_3_4_0
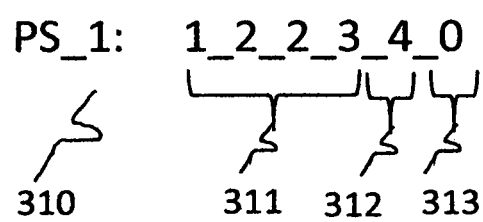
310  311  312  313
PS_2: 2_1_1_3_1_4_1
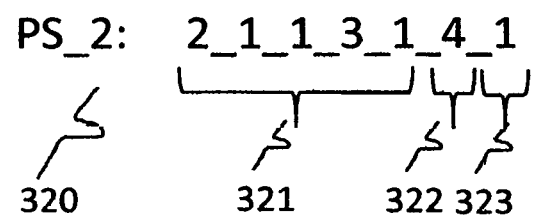
320  321  322 323
PS_3: 1_4_0            PS_4: 1
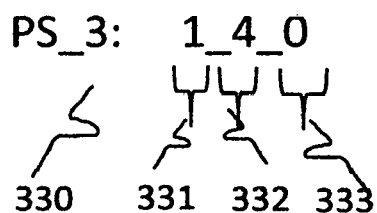   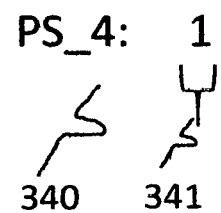
330 331 332 333        340  341
*FIG. 3*

|     | 401 | 402 Actual | 403 Sum4 | 404 Description | 405 Actual | 406 Sum5 | 407 Description |
| --- | --- | --- | --- | --- | --- | --- | --- |
| 1   |     | 1111 |     | 000 | 11111 |     | 0000 |
| 2   |     | 112  |     | 001 | 1112  |     | 0001 |
| 3   |     | 121  |     | 010 | 1121  |     | 0010 |
| 4   |     | 211  |     | 011 | 1211  |     | 0011 |
| 5   |     | 22   |     | 100 | 2111  |     | 0100 |
| 6   |     | 13   |     | 101 | 122   |     | 0101 |
| 7   |     | 31   |     | 110 | 212   |     | 0110 |
| 8   |     | 4    |     | 408 — 111 | 221 |     | 0111 |
| 9   |     |      |     |     | 113   |     | 1000 |
| 10  |     |      |     |     | 131   |     | 1001 |
| 11  |     |      |     |     | 311   |     | 1010 |
| 12  |     |      |     |     | 23    |     | 1011 |
| 13  |     |      |     |     | 32    |     | 1100 |
| 14  |     |      |     |     | 14    |     | 409 — 1101 |
| 15  |     |      |     |     | 41    |     | 410 — 1110 |
| 16  |     |      |     |     | 5     |     | 411 — 1111 |

*FIG. 4*

| | Need | Available | Remain | Worth |
|---|---|---|---|---|
| | 502 | 503 | 504 | 505 |
| Sum4 | 7 | 8 | 1 | |
| Sum5 | 13 | 16 | 3 | |
| Sum6 | 24 | 32 | 8 | |
| Sum7 | 44 | 64 | 20 | |
| Sum8 | 81 | 128 | 47 | |
| Sum9 | 149 | 256 | 107 | |
| Sum10 | 274 | 512 | 238 | |
| Sum11 | 504 | 1024 | 520 | |
| Sum12 | 927 | 2048 | 1121 | |
| Sum13 | 1705 | 4096 | 2391 | |
| Sum14 | 3136 | 8192 | 5056 | |

| No | Class |
|---|---|
| 1 | 4 |
| 2 | >4 |
| 3 | 1_4 |
| 4 | 2_4 |
| 5 | 3_4 |
| 6 | 4_4 |
| 7 | 5_4 |
| 8 | 6_4 |
| 9 | 7_4 |
| 10 | 8_4 |

FIG. 9

| No | Class |
|---|---|
| 11 | 9_4 |
| 12 | 10_4 |
| 13 | 11_4 |
| 14 | 12_4 |
| 15 | 13_4 |
| 16 | 14_4 |
| 16+k | (14+k)_4 |
| (16+m)+1 | (14+m+1)_3 |
| (16+m)+2 | (14+m+2)_2 |
| (16+m)+3 | (14+m)_3_1 |
| (16+m)+4 | (14+m+1)_2_1 |
| (16+m)+5 | (14+m+2)_1_1 |
| (16+m)+6 | (14+m)_3_2 |
| (16+m)+7 | (14+m+1)_2_2 |
| (16+m)+8 | (14+m+2)_1_2 |
| (16+m)+9 | (14+m)_3_3 |
| (16+m)+10 | (14+m+1)_2_3 |
| (16+m)+11 | (14+m+2)_1_3 |
| (16+m)+12 | (14+m+3)_4 |

FIG. 10

BINARY ENCRYPTION / DECRYPTION METHOD FOR SECURE AUDIO / VIDEO BROADCAST AND COMMUNICATION AND FOR DATA TRANSMISSION / STORAGE

FIELD

The present disclosure relates to data encryption/decryption methods, and in particular to binary data encryption/decryption methods that are suitable to be implemented in silicon, as a circuit, in addition (or not only) to be implementable in software.

BACKGROUND

Certain aspects disclosed in the utility patent application (UPA) mentioned below are being used in the present disclosure. This UPA is filed by the same unique inventor as the present disclosure. This UPA is mentioned here as background for this disclosure. The present disclosure represents new matter. This background utility patent application (UPA) is:
  EFS ID: 43475104
  Application Number: 17398728
  Applicant Name: Radu Mircea Secareanu
  Filing date: 10 Aug. 2021

SUMMARY

There are two primary aspects that are disclosed:
  a. The data encryption/decryption method in itself
  b. The suitability of the disclosed data encryption/decryption method for hardware implementation Across the disclosure, the data encryption/decryption method will be referred to as "method", or "technique", or DED method, all being equivalent.

Regarding the first disclosed aspect—the data encryption/decryption method in itself. At the onset, a note regarding the structure of this disclosure is required, note that will enable better understanding of the flow of the disclosure. Key concepts are defined, detailed, exemplified, concepts that the disclosed embodiments from the present disclosure are based on. The DED method in progressively introduced during this process.

In summary, the DED method works as follows: an Initial Full Data String (IFDS) is serially partitioned into a number of sequential Processing Strings (PS), where the length of each PS is determined by two conditions: 1) the occurrence of a fixed bit pattern, called Delimiter (DE) or by the reach of a set limit number of bits, and 2) by the desired encryption strength to be implemented. The concept of "encryption strength" in this context will be detailed later in this disclosure. Every such determined PS is classified and then encrypted in two independent ways:
  a) individually, every PS is encrypted as a whole, and
  b) the said PS classification of every two adjacent PS, are encrypted Once the end of the IFDS is reached, it is called that the end of one encryption cycle is reached. Yet another encryption cycle can be applied to the data by repeating the process, using as new IFDS the output of the just completed cycle, since the said output has a very different structure as compared to the initial input IFDS. The size of the output from one completed cycle is exactly the same as the size of the input IFDS, no matter the said size of PS, or said applied encryption of the individual or every two adjacent PS, therefore the size of the data is always the same, no matter the encryption complexity. Unlimited number of cycles can be processed for unlimited encryption complexity, as will be disclosed here. The decryption is perfectly mirrored to the encryption process, leading to an identical restored file to the initial IFDS, which was the input to the first cycle.

In summary, there are several fundamental encryption approaches disclosed here:
  1. The length of the partitioned PS represents an encryption choice applicable to every IFDS. There are thirteen lengths considered as practical, that are proposed and discussed. For sophisticated encryption applications, the length of the partitioned PS has no theoretical limits—practically, the only limitation, or cost, being the memory that is associated to an increase in PS length, as explained in the disclosure
  2. Individual PS encryption—same PS can have a different encryption during one given cycle. There are several encryption variables applicable in this category, as will be detailed in this disclosure.
  3. Two consecutive PS can be paired and have a different encryption during one given cycle. There are several encryption variables applicable in this category as well, as will be detailed in this disclosure.
  4. The above three encryption approached can be varied without any limits by repeating the cycle unlimited times, i.e., the above mentioned encryption choices (variability) are multiplied in term of variability by the number of cycles.

The practically unlimited encryption choices, or encryption space, will become apparent, as the disclosure is being presented. An important highlight is regarding an important goal of this disclosure—the encryption space has practically no limits, but even with all this space, the file remains the same size no matter the encryption complexity. While this is a goal of this disclosure, the embodiments disclosed here are in no way limiting to be applied to a file compression or expansion process that occurs before or during the encryption/decryption process.

Regarding the second disclosed aspect—the suitability of the disclosed DED method for hardware implementation. As will be apparent from the details presented in this disclosure to a person familiar with digital design, the DED method can be immediately implemented using basic digital circuitry. In addition, due to the serial nature of the DED method, the various stages of combinatorial logic are suitable to be placed in a pipeline (again, a concept familiar for people skilled in digital design), the pipeline implementation (in a single, non-parallel data path) providing the highest encryption/decryption speed possible in a hardware implementation.

A topic of interest is an indication regarding the implementation complexity and performances of the encryption/decryption process. This will be summarized briefly next, referring to a hardware implementation of the DED method. A software implementation of the DED method is going to be discussed in this disclosure as a parallel to the hardware implementation which receives first priority in this disclosure.

Referring to the four encryption approaches outlined above, the first three are applicable within any given cycle. The fourth encryption approach refers to repeating cycles, where the encryption choices applicable to the first three approaches are changed. To give an order of magnitude estimation for the encryption speed, consider that the encryption chip operates with a 2 GHz clock, in-between two consecutive pipeline stages there are twenty clock cycles, and one PS flows sequentially through the pipeline over every pipeline stage. Consider two cases-encryption in one cycle (1, 2, 3 approaches apply), and encryption in multiple cycles (1, 2, 3, 4 approaches apply).

1. Encryption in one cycle
   a. The encryption speed is (size of IFDS)/(average size of PS)*(20 clock cycles)
      i. Example 1: size of IFDS is 1 Mbit and average size of PS is 20 bits---speed is 1 million clock cycles. At 2 GHz clock, that is 0.5 ms.
      ii. Example 2: size of IFDS is 2 Gbits and average size of PS is 10 bits---speed is 200 million clock cycles. At 2 GHz clock, that is 0.1 s.
   b. Another way to look at speed for one cycle encryption is from the point of view of latency of the data flow. In this case, encrypted data is available every 20 clock cycles (every one pipeline stage latency)---which means that from this point of view, in the one cycle case, the encryption speed is one pipeline stage (20 clock cycles). At 2 GHz clock, that is 10 ns.
2. Encryption in multiple cycles
   a. The encryption speed is (size of IFDS)/(average size of PS)*(20 clock cycles)*(number of cycles)
      i. Example 1: size of IFDS is 1 Mbit and average size of PS is 20 bits, 10 cycles---speed is 10 million clock cycles. At 2 GHz clock, that is 5 ms.
      ii. Example 2: size of IFDS is 2 Gbits and average size of PS is 10 bits, 5 cycles---speed is 1 billion clock cycles. At 2 GHz clock, that is 0.5 s.
3. For both encryption in one cycle and encryption in multiple cycles, for the first cycle only, there will be a data latency coming from the data preparation, as will be discussed in the disclosure. This data latency depends on the desired encryption strength.

Decryption speed is essentially similar (or largely equal) to the encryption speed.

In conclusion of this summary chapter, the embodiments that are disclosed here permit the following highlights to be stated:
i. The DED method offers four fundamental encryption approaches, with practically an unlimited variation for encrypting a binary file.
ii. The encrypted file is always the same size as the original file, no matter the encryption complexity that is being applied.
iii. The DED method can be implemented in hardware straightforward, in a pipelined, memory based architecture, leading to a high data throughput.
iv. The encryption speed is essentially the same as the decryption speed, where said speed is directly proportional with the number of encryption cycles and the size of the binary string to be encrypted.

BRIEF DESCRIPTION OF DRAWINGS

Embodiments will be described, by way of example, with reference to the drawings, in which

FIG. 2 and FIG. 3 is used to summarise additional key concepts for this disclosure, such as delimiter (DE), link bit (LB), processing string (PS), PS core, and PS characteristic number (or Sum), concepts used in one or more of the embodiments.

FIG. 4, FIG. 5, FIG. 6, and FIG. 7 are used to summarise the procedure to create the unique correspondence and assignment between an input PS and the corresponding output description, unique correspondence and assignment used in one or more of the embodiments.

FIG. 9 and FIG. 10 are used to introduce how to uniquely describe any input binary string in term of processing strings and constructs specific to this disclosure, unique description that is used in one or more of the embodiments.

DETAILED DESCRIPTION OF THE INVENTION

At the outset it should be noted that the examples presented in the disclosure are in no way limiting, and the skilled person will appreciate that the disclosure is equally applicable to multiple variations and alternatives, and multiple optimizations are possible to increase the performance, such as the encryption variability.

Several concepts relevant for this disclosure are discussed in detail next, including by using examples.
1. First bit (FB), alternate bits (AB), and relative bits (RB)
2. Delimiter (DE) and link bit (LB)
3. Bit sum (Sum) and processing string classification (PS class)
4. Processing string format (PS format) as full PS, exception PS, and termination PS
5. PS input core acceptable configurations (ICAC), PS output description configurations (ODC), and PS remain output description configurations (RODC).
6. Root identifiers (RI) and absolute identifiers (AI)

Figure 1:
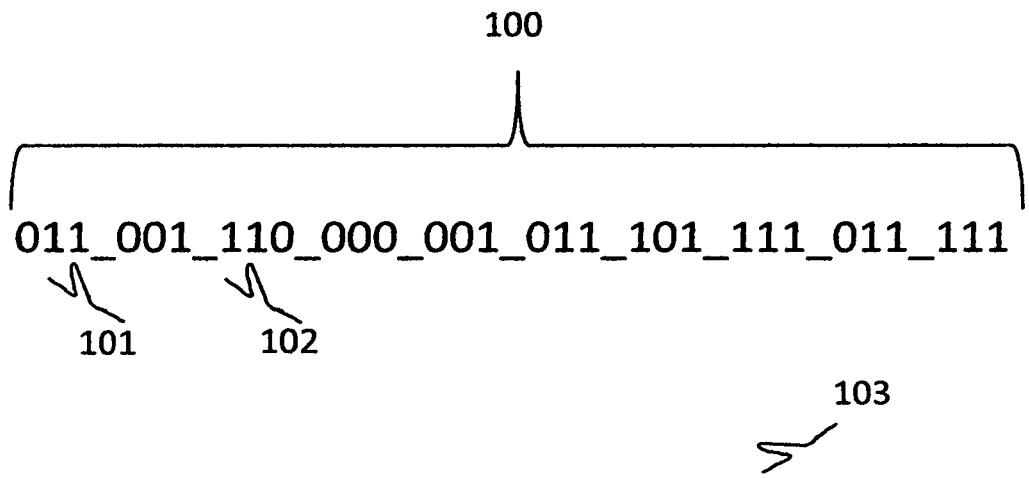
FIG. 1 is used to summarise several key concepts for this disclosure, such as first bit (FB), alternate bits (AB), relative bits (RB), and RB transformation, concepts used in one or more of the embodiments.

FIG. 1 is used to summarise the FB, AB, and RB concepts.
a. In any binary string, there are groups of same type bits, with the bits in any two such consecutive groups alternating. String 100 is an example string, considered here to exemplify the concepts. In string 100, 101 is the first bit (FB) in this string, with a value of 0. 102 is pointing to an underscore, used to improve string readability in this discussion.
b. String 100, rewritten in term of AB, is shown at 106. The numbers represent the number of bits in alternating groups of same type bits. 103 represents string 100, rewritten in term of FB and AB.
c. The relative bit is defined as the change in the upcoming bit relative to the current bit. If the upcoming bit changes value (0 to 1 or 1 to 0), the relative bit has a value of 1. If the upcoming bit has a constant value (0 to 0 or 1 to 1) the relative bit has a value of 0.
d. The RB transformation of string 100 is shown at 105, while the string 100 rewritten to incorporate RB transformation, in term of AB and FB is shown at 104 (107).

FIG. 2 and FIG. 3 is used to summarise the DE, LB, PS, PS core, and PS characteristic number (or Sum) concepts a. A delimiter (DE) is defined as a group of bits of a chosen pattern. A group of four same type bits is used in this disclosure as DE.
b. DE is used to define a PS-a PS is defined as any collection of groups of same type bits in-between two consecutive DE, where said collection ends with a DE, and where, for the DE defined as a group of four same type bits, any such group in-between two consecutive DE has less than four same type bits.
c. Given the above definitions, string 200 in FIG. 2 has two PS (PS_2 and PS_3, shown as 220 and 230). PS_1 (210) is the first PS in the string, and PS_4 (240) is the last PS in the string.
d. The link bit (LB) is introduced because after a DE, same type or opposite type bits can follow. For example, 221 has the same type bit as the 211 DE, while 231 has the opposite type bit as the 222 DE. LB has a value of 0 if same type bits follow, and has a value of 1 if opposite type bits follow.
e. In FIG. 2, 204 for PS_1, 221 plus 205 for PS_2, and 231 for PS_3 are called PS core. 241 for PS_4 (termination PS) is called PS content.
f. In FIG. 2, the IFDS (200) and every PS have been described in term of absolute bits for clarity. However, in this disclosure, the equivalent FB/AB representation (detailed in FIG. 3) is required (where AB can be a representation of IFDS RB transformation).
g. In FIG. 3, the FB/AB for PS_1, PS_2, PS_3, and PS_4 are shown as respectively 310, 320, 330, and 340. For PS_1, PS_2, and PS_3, 311, 321, and 331 respectively represent the PS content, 312, 322, and 332 represent the PS DE, 313, 323, and 333 represent the PS LB. For PS_4 termination PS, 341 is the content.
h. With reference to FIG. 3, adding all the bits in a PS core, a PS characteristic number, or Sum, is obtained. For PS_1, 311 gives a Sum of 8, for PS_2, 321 gives a Sum of 8, for PS_3, 331 gives a Sum of 1. Sum cannot be defined for a termination PS.
  a. The three PS are classified as Sum_DE, namely PS_1 as 8_4, PS_2 as 8_4, PS_3 as 1_4.
i. As mentioned, LB is introduced to handle the bits coming after a DE. When DE consists of four same type bits (as considered in this disclosure):
  a. If the bits coming after a DE are less than four same type bits, then these bits become part of the next PS (as exemplified by PS_2 and PS_3 above).
  b. If the bits coming after a DE are four or greater same type bits, these bits become what is called an exception PS. The characteristic of an exception PS is that it has a core of zero bits, the content is made of all bits of same type following a DE until that bit type changes value, and since the content indicates when the bit changes value, an exception PS does not need a link bit.
  c. An exception PS always comes after a DE, with the only exception being that it can be the first PS in an IFDS.

There are four types of supported PS therefore:
Full PS, always in-between two consecutive DE or as the first PS in an IFDS, having a core, a DE, and a link bit, defined as class Sum_DE (for example, 1_4)
Exception PS, always follows a DE or is the first PS in an IFDS, having a content only, where the content is always greater or equal to four same type bits Termination PS, always the last PS in an IFDS.
Open-string PS, always following a full PS, an exception PS, or another open string PS, having core only and characterized by the fact that the core reaches a set number of bits without a DE occurring.

All the concepts above describe how to identify, classify, and format a PS in an input IFDS. The next concepts refer to how to uniquely format the output in accordance to each and every input PS. To exemplify this unique correspondence that is being created between input PS and output, initial focus is on full PS.

Figures 5, 6:
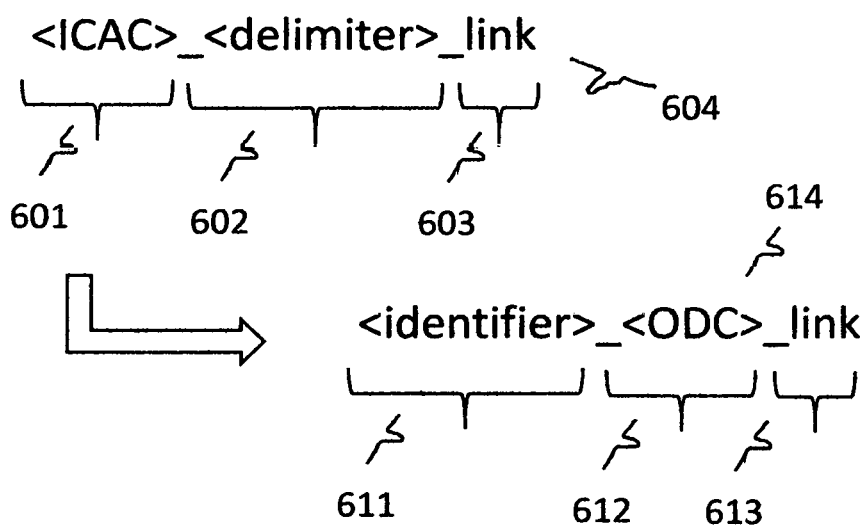

As mentioned, a full PS consists of core, DE, and LB. Each of these three components will be discussed, outlining the unique input-output correspondence and transformation.
  a. The four bit DE at the input becomes a four bit identifier at the output, uniquely identifying the input PS classes.
  b. The core:
    a. When written in FB/AB format, two configurations are enabled to have the same description, and this constitutes one of the main advantage of using the FB/AB format. For example, in class 4_4, configurations 0110 and 1001 (absolute bits) have the same AB format description, namely 121 (one bit-two bits-one bit).
    b. Core configurations containing groups of 1, 2, and 3 same type bits are called acceptable configurations. There are also non-acceptable configurations. To understand the concept of acceptable and non-acceptable configurations, the delimiter rule (i.e., the rule that says that in-between two delimiters only groups of 1, 2, and 3 same type bits can exist) will be ignored in the discussion to follow. The position of two initial delimiters is maintained. By ignoring the delimiter rule but keeping the location of the initial delimiters, groups of four or more same type bits in-between two delimiters can exist. For example:
      i. A PS class with Sum smaller than 4 (classes 1_4, 2_4, and 3_4), has only acceptable configurations.
      ii. A PS class with Sum greater or equal to 4 has both acceptable and non-acceptable configurations. These are exemplified in FIG. 4, for the first two classes with Sum greater or equal to 4 (class 4_4, and class 5_4, for which Sum=4 (shown as 403) and Sum=5 (shown as 406)). Looking at the 401 index, for class 4_4, the first seven configurations of the core are acceptable, while the 8th configuration (408) is not acceptable. Similarly, for class 5_4, the first 13 configurations are acceptable, while the last three (409, 410, and 411) are not acceptable.
    c. Both the acceptable and non-acceptable configurations receive a unique description 404/407 that correspond to every actual existing input core configuration 402/405.
    d. The acceptable configurations are called ICAC (input core acceptable configurations). The unique description corresponding to every ICAC is called ODC (output description configuration), while the description corresponding to every non-ICAC configuration is called RODC (remain output description configuration).
    e. RODC increases as the class order (or SUM) increases. This is shown in FIG. 5.
      i. As mentioned, class 1_4, 2_4, and 3_4 (Sum=1, Sum=2 and Sum=3) have only ICAC, therefore do not have RODC.
      ii. Classes 4_4 to 14_4 (Sum=4 to Sum=14, listed in column 501), all have RODC. The number of RODC for every class is listed in column 504. As shown, this number increases as the class order increases. Column 502 represents the ICAC for a respective class, while column 503 represents the total supported configurations in that class (ODC+RODC). The worth factor (column 505) will be discussed later.

c. The LB a. Note that LB for a PS in an input IFDS is an abstract concept, i.e. it is a bit that does not exist in reality. This bit is defined and introduced because, the same LB, with the same value, is required in the unique corresponding output.

In FIG. 6, the input (604) to output (614) transformation for a full PS is shown. 601, 602, and 603 are the three input components (core or ICAC, DE, LB), and 611, 612, and 613 are the three output components (identifier, ODC corresponding to ICAC, and LB).

Figure 7:
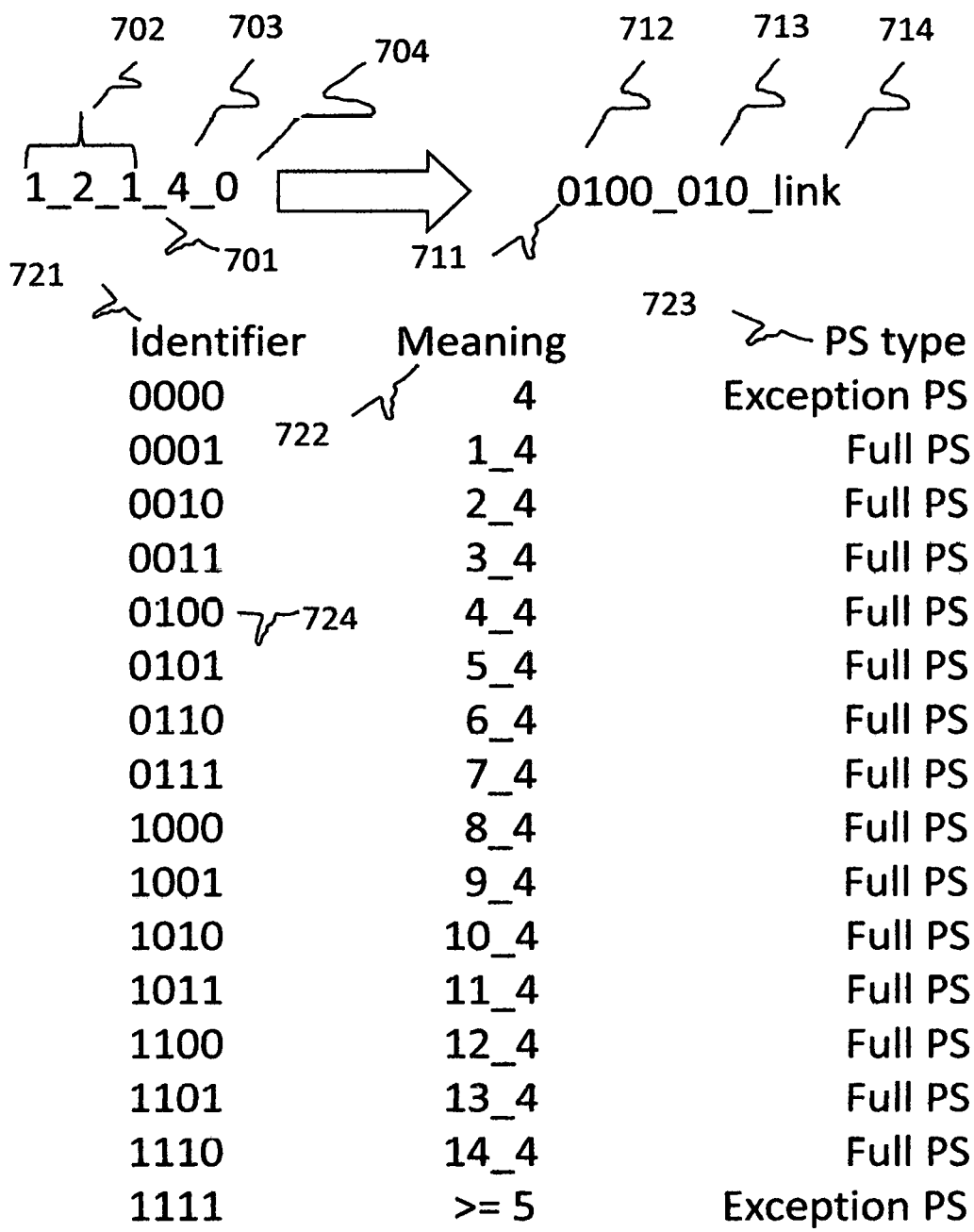

An actual example of such input-output transformation, together with a full list of identifiers and their meaning, are shown in FIG. 7. The input PS is 701, consisting in core (702), DE (703) and LB (704). To this specific input PS, the corresponding output is 711, with 712 being the identifier, 713 being the ODC, and 714 being LB. Note that 713 (010) corresponds to the 121 core, as shown in FIG. 4 at class 4_4, while the identifier for class 4_4 (column 722) is 0100, shown by 724, corresponding to a full PS as indicated in column 723. The list of all identifiers, for all classes, is detailed in column 721.

The identifiers listed in column 721 are called core identifiers. Note that they are used for exception PS (0000 and 1111), for PS classes that do not generate RODC (0001, 0010, and 0011), and for PS classes that generate RODC (all other 11 identifiers).

The RODCs generated by the 11 classes that generate RODC (classes 4_4 to 14_4) become identifiers in themselves for PS classes larger than 14_4 and for open string PS.

These RODCs are characterized by a "Worth" factor-column 505 in FIG. 5. To give an example of such a worth factor, consider the single RODC generated by class 4_4. This RODC becomes a seven bit identifier (0100_111) for classes larger than 4_4. This 7 bit identifier can cover two class 5_4 configurations, 4 class 6_4 configurations, 211 class 15_4 configurations, and so on, for every class, the worth factor increases by a factor of 2.

Next, the concepts of absolute identifier (AI) and root identifier (RI) are reviewed.

An absolute identifier represents the full description of the output configuration used to describe an input PS For example, if the input PS is a class 4_4 full PS, specifically 1_2_1_4, this corresponds to an output description of 0100_010, and this is known as the absolute identifier for the 1_2_1_4 full input PS. Of course, the AI for a full PS is always followed by an LB, but the LB is not part of the AI.

A root identifier (RI) is defined as the minimum common root to describe a group of AI within a single class only.

For example, considering class 4_4 for this discussion:

the 7 configurations of class 4_4 can be described as 4+2+1 in term of primary binary numbers.

Accordingly, class 4_4 has three root identifiers, the first one representing a group of 4 configurations, the second one representing a group of 2, and the third one representing a group of 1 configuration.

The root identifier consists of the core identifier (see FIG. 7), followed by the root of each of the three groups (see FIG. 4): 0100_0 for the first group, 0100_10 for the second group, and 0100_110 for the third group.

Therefore, class 4_4 has three RI-a five bit RI representing a group of 4 configurations, a six bit RI representing a group of 2 configurations, and a seven bit RI representing a group of 1 configuration. The three root identifiers are called to be of class 5, class 6, respectively class 7.

The three RIs, as described, are primary RIs. These can be transformed in three 6 bit RI (with two configurations each) and one 7 bit RI, or can be transformed in seven 7 bit RI.

Figure 8:
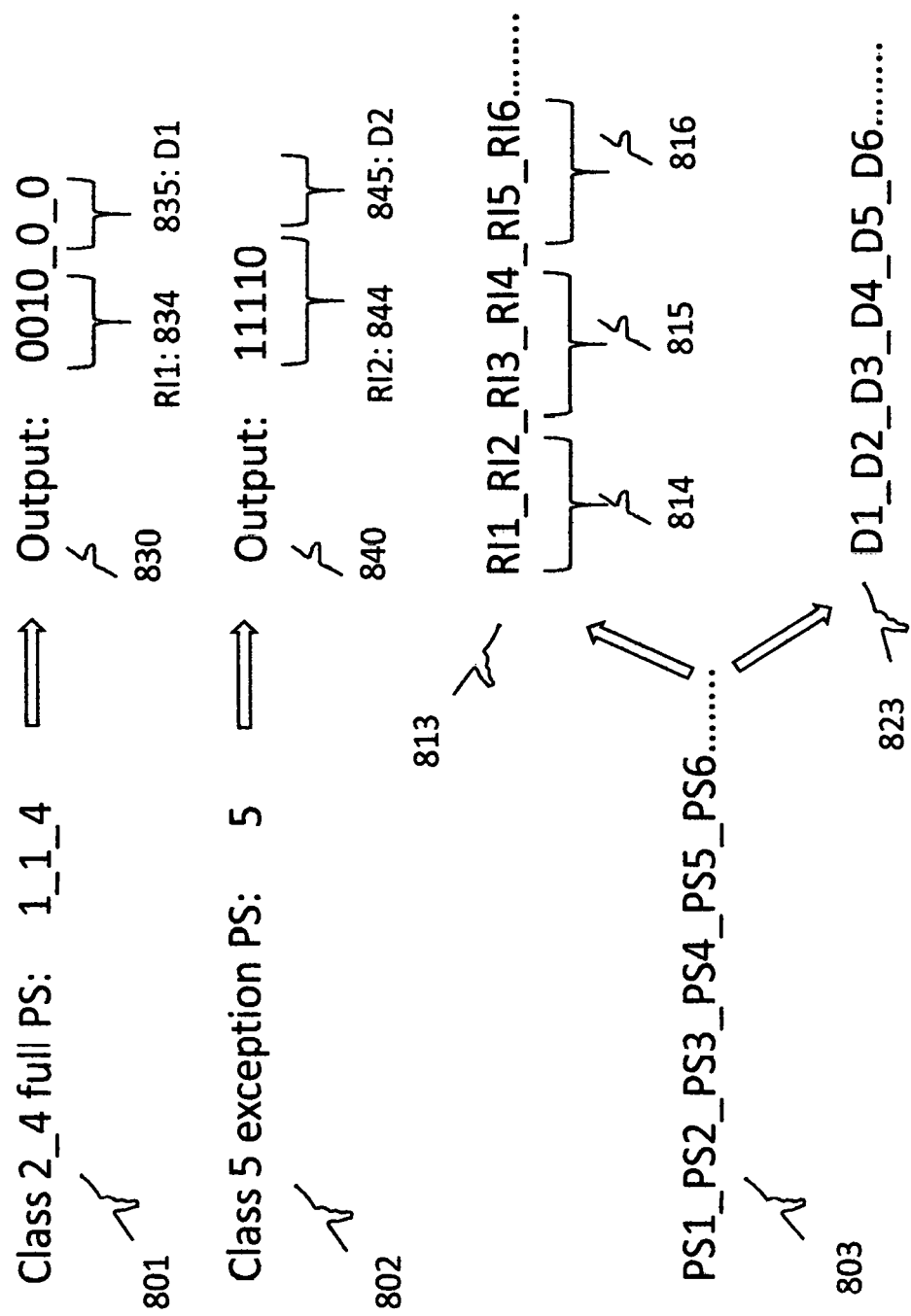
FIG. 8 is used to summarise the concepts of absolute identifier (AI) and root identifier (RI), as well as the procedure in which these are used, concepts and procedure used in one or more of the embodiments.

When an output is described using RIs, the output will consist of two strings, instead of 1 string, as exemplified in FIG. 8, where two PS are considered as an example for this discussion.

The first PS, 801, is a class 2_4 full PS. Normally, this is unitary described at the output as 830. Any such unitary output of a PS has two components: an RI (RI1, as 834) and a detail (DI1, as 835), detail part representing the remainder after removing the RI.

The second PS is an exception PS, 802, normally described as 840, and described in term of RI and detail as 844 and 845. Note that for exception PS, the detail part is null.

The regular output would be 803 (a single string, consisting of one output PS after another, in order).

When RI plus Detail description is used, the output will consist of two strings, 813 and 823, one string consisting of RIs, and the other string consisting of details of each output PS, in order. In the RI string, the RIs are paired, as shown by 814, 815, 816, for further processing, as will be shown. No further processing is performed in the detail string.

One of the key goals of this disclosure is the development of a DED method where, irrespective of the DED complexity, the size of the encrypted/decrypted file remains exactly the same as the initial file. This goal is achieved by defining a set of limited number of PS classes so that any IFDS can be encrypted and then seamlessly reversed (decrypted). This limited number of PS classes is defined and discussed with reference to FIG. 9 and FIG. 10 (FIG. 10 is a continuation of FIG. 9). In these two figures:

901 column is an index, or a counter, showing how many PS classes

902 column is showing the corresponding PS class, for every index

The 903 row in FIG. 9 relates to exception PS (per the exception PS definition). In reality, there is a class for exception PS of class 5, one for class 6, and so on. Row 903 condenses all these classes into one entry. As shown in FIG. 7, exception PS of greater or equal to 5 same type bits uses the core identifier 1111 (5 is 1111_0, 6 is 1111_10, 7 is 1111_110, and so on).

Classes 1_4 to 14_4 do not require any further comments. These are full PS classes, and have been discussed also with reference to FIG. 7 and partly with reference to FIG. 5.

At row 904 in FIG. 10, variable k is introduced.

This k variable has a range from 1 to m, with m being the maximum value. Variable m can be minimum 1, case in which the range for k is 1 to 1, i.e. 1.

All classes (14+k)_4 are regular, full PS classes. Note that position 904 represents multiple entries. For example, if m=10, position 904 represents ten entries, i.e. ten classes, from 15_4 to 24_4. If m=1, position 904 represents one entry, i.e. class 15_4.

The value for m is chosen as one of the variables to increase the encryption strength. The larger the m value, the stronger the encryption, but the larger the complexity, where one of the implementation measures for complexity is the memory needs.

Since the memory needs is mentioned, clarifications are required. For example, if m=1, the memory needs needed to encrypt all configurations is about 190k binary words of 22 bits. If m=13, the memory needs to encrypt all configurations reaches about 300M binary words of 34 bits. As m increases further, the trend is apparent (memory increases and the binary word necessary for one memory location increases).

Starting with 905, the maximum value of k, m, is relevant. To focus the discussion, m=1 (k=1) will be considered. 904, position 17, is class 15_4.

905 and 906 are classes 16_3 and 17_2.

Regular full PS classes, of format such as 15_4 (generally x_4) mean that in the 15 bits preceding the 4 same type bit DE termination, any combination of same type bit groups of 1, 2, and 3 bits can occur. Classes 16_3 and 17_2 have the same meaning, but the termination is 3, respectively 2 same type bits. Both classes 16_3 and 17_2 use a link bit just like a regular full PS, so, after the 3, respectively 2 termination, any number of bits of same type or opposite type as the termination can occur.

Positions 907 to 915 consist of three groups of classes: the 15_3 group, the 16_2 group, and the 17_1 group.

Each group consists of three classes: 15_3_1, 15_3_2, and 15_3_3, then 16_2_1, 16_2_2, and 16_2_3, respectively 17_1_1, 17_1_2, and 17_1_3.

The meaning of the three numbers is as discussed above. For example 15_3_1: 15 supports any combination of 1, 2, and 3 same type bits, and 3 and 1 are terminations of 3 respectively 1 same type bit groups. The last bit in the 15 always changes value with the group of 3, which always changes value with the group of 1.

The first two numbers always make 18 when summed (15+3, 16+2, and 17+1).

15_3, 16_2 and 17_1 are the only possible combinations in an 18 bit in the defined conditions disclosed here.

The third bit is always 1, 2, and 3 for all three 15_3, 16_2, and 17_1 groups.

None of the nine classes require a link bit (LB). This is key, because it allows to "pack" double the amount of output combinations in the same number of bits. This also means that the bit coming after the 1, 2, respectively 3 same type bit termination, always changes value.

Note that all three groups generate 18_1, 18_2, and 18_3, in different configurations (as 15_3, 16_2, or 17_1). So, in order to close and have any combination possible, regular 18_4 full PS class (with LB) is needed to be added—and that is done on position 916 (position 29 for m=1).

Accordingly, the above collection of classes, as presented and discussed with regard to FIG. 9 and FIG. 10, permit the encryption of any IFDS, using a predefined maximum number of bits.

In the case of m=1, this predefined maximum number of bits is 22 (18+4 from class 18_4).

In the case of m=13, this predefined number of bits is 34 (30+4 from class 30_4).

For any m, classes at positions 907 to 915 offer the needed open string, as defined. Classes at 907 to 915 are open string PS classes. These classes clearly have their own RI.

The number of required classes to cover any IFDS depends on the encryption strength that is chosen. For example, for m=1, 29 classes are needed. For m=13, 41 classes are needed. In other words, the number of classes required to cover any IFDS is 28+m.

Full PS, exception PS, and open string PS have all been clarified. A few words about a termination PS are required.

As described, the largest class, in term of bit length, is class 18_4 for m=1, and 30_4 for m=13. That is a 22 bit respectively 34 bit maximum PS, for a number of classes equal to 28+m. This indicates that the maximum PS can be written in tem of number of classes as 28+m−7, or 21+m.

A termination PS is defined as a string of data, (21+m) bits or less in length, representing the last bits before the end of an IFDS.

In other words, the last (21+m) bits or less of an IFDS are not processed through the normal procedure as described in this disclosure, no matter what these last (21+m) bits or less contain, including if these bits contain a full PS of any class that fits in the (21+m) bit space, an open string, or (21+m) bits of same type (an exception PS). The following need to be clarified:

a. If any class starts before the (21+m) bit from last and extends into the last (21+m) bits of the IFDS, it is processed normally.

b. Anything within the last (21+m) bits of the IFDS, even if it is a class that would start and complete before the IFDS ends, is processed differently.

This different processing named above at b. is introduced next.

Since in the termination PS there is no restriction such as that imposed by the delimiter rule so that in the PS core there are only groups of 1, 2, and 3 same type bits, the termination PS can contain groups of any number of same type bits, from 1 to (21+m).

For every such group of "y" same type bits in the termination PS, the representation in the output will be (y−1) of 1 and 1 of 0.

Example 1: group of 1 same type bit (y=1). Representation is 0 (y−1) of 1 and 1 of 0, i.e. representation is bit 0.

Example 2: group of 14 same type bits (y=14). Representation is 13 (y−1) of 1 and 1 of 0, i.e. representation is 1111_1111_1111_1_0.

Always:

The last 0 from the representation of the bits of the termination PS in the output is dropped, since that last 0 is self understood, therefore redundant.

If the IFDS ends in the maximum applicable class (for example 18_4 for m=1 or 30_4 for m=13), the LB of that class is not necessary anymore, therefore will be dropped.

A termination PS does not have a specific class assignment, or RI. A termination PS is therefore left as is, and the hardware or software implementation of the encryption will recognize the termination PS being the last PS in the IFDS and based on the above described rules.

A very well defined set of primary root identifiers (RI) can be derived for this 28+m set of PS classes. As defined and discussed, primary RI are RI that are not transformed, i.e. they represent each and every class as is.

An example is provided for this discussion, in order to advance in the description of the disclosure.

For m=1, there are 29 classes of PS, as described above

In accordance to the derivation of primary RI, as outlined above, these 29 classes have primary RI of class 4 to class 21. The total number of primary RI for all these 29 classes is 148. Each of the 18 primary RI classes (4 to 21) have a well-defined number of RI members. For example, class 4 has 5 RI members, class 5 has 10 RI members, class 6 has 12 RI members, and so on.

As discussed with reference to FIG. 8, the output can be described by two strings: the RI string, and the detail string. The RI string can be further processed by pairing consecutive RI.

Processing of multiple RI (such as three, or four) can be developed, and this is in no way limiting to the content presented in this disclosure, with the title of example or otherwise.

When pairing two consecutive RI, the resulting pair has in-between 8 and 42 bits.

For example:
Example 1:
i. As mentioned, there are five primary RI of four bits (class 4 RI)
ii. If, in the output, there are two consecutive class 4 RI, they create an eight bit unique pair. Since there are five such class 4 RIs, the pair can have 25 possible alternatives.
Example 2:
i. An RI pair that has ten bits, can be constituted by classes of RI 4-6, 5-5, or 6-4. The total number of such alternatives for an RI pair of 10 bits is 220.

Every RI pair of 8 to 42 bits will accordingly have a set number of alternatives, or members. For one pair, the number of such alternatives varies between minimum 16 (for pairs of 42 bits) and maximum 1276 (for pairs of 22 bits). The total number of pairs is, in this case of m=1, 21904.

Each of these 21904 pairs can be described, with an equivalent word that has an equal number of bits to the original.

For example, an 8 bit RI pair, that has 25 alternatives, can be described by 000_xxxxx, where xxxxx (five x) will cover the 25 alternatives. The seven remaining options (xxxxx has 32 positions) will be used as 14 positions for the nine bit RI pair.

Similar to the PS discussion, for these RI pairs, the following can be defined:

RI pair classes.
An RI pair class is a group of RI pairs that result in the same number of bits. For example, an RI pair that has 8 bits (resulting from pairing an RI of 4 bits with an RI of 4 bits), is called to be of class 8. An RI pair that has 10 bits, resulting from pairing RI of (first RI-second RI) 4-6, or 5-5, or 6-4 bits, is called to be of class 10. Each such RI pair class will have an equivalent description as described for class 8 (i.e. 000_xxxxx).

For m=1, there will be therefore 35 RI pair classes (from class 8 to class 42). As m increases, the number of RI pairs increases, leading to further encryption strength.

Each RI pair class has its own number of RI pairs. As mentioned above, for example, for m=1, class 8 has 25 pairs, class 10 has 220 pairs, class 22 has 1276 pairs, and class 42 has 16 pairs.

RI pair headers.
Similarly to PS classes where core identifiers have been defined, for the RI pairs, the equivalent of core identifiers can be defined. For RI pairs, these core identifier equivalency are called headers, and are made of the first three bits in the equivalent description of an RI pair, i.e. from 000 to 111. Note that each header is common to multiple RI pair classes, and that is different from PS classes where each core identifier was specific to one class.

RI pair root identifiers (RI2)
The parallel between PS class RI and RI pair class RI is apparent at this point
For example, as mentioned, the class 8 RI pair is described by 000_xxxxx, where xxxxx (five x) will cover the 25 alternatives.
Similarly as done for the PS class RI, number 25 is described in term of primary binary numbers as 16+8+1.
That means that class 8 RI pair has three root identifiers, therefore, three RI2 can be defined for class 8 RI pair
First RI2 is a four bit RI2, namely 000_0, and represents 16 alternatives
Second RI2 is a five bit RI2, namely 000_10, and represents 8 alternatives
Third RI2 is an eight bit RI2, namely 000_11_000, and represents one alternative
Putting together all RI2 from all RI pairs, 39 RI2 classes, from 4 to 42, with multiple members in each RI2 class, are formed As mentioned in the summary section, there are four encryption approaches that are disclosed. At this point, sufficient insight has been described in order to allow appropriate description of the four encryption approaches.

First encryption approach: The length of the partitioned PS represents an encryption choice.
This is done by choosing the value of variable m, greater or equal to 1 (as discussed with reference to FIG. 9 and FIG. 10). The maximum length of a partitioned PS is 22 bits (for m=1), 34 bits (for m=13), to any integer value (proportional to m, greater than 13).
Theoretically, there is no limit for m. Practically, m is limited by memory needs, as described. For demanding encryption applications where cost is secondary, large values for m can be chosen. The larger the value for m, the higher the encryption strength.
There are immense consequences from choosing the value of m. As described above, as m increases, the number of PS classes increase, the length of PS increases, the number of upper-class identifiers increases, the number of RI, RI2, and others, all increase, with immense consequences on increasing the encryption strength, encryption space, and the number of encryption keys, as described below.

Second encryption approach: Same PS and its derivatives (such as RI) can have a different encryption during one given cycle. There are three aspects here, leading to three encryption variables.

First encryption variable: The assignment of an ODC to an ICAC within every given PS class
To exemplify, consider class 4_4, as detailed with reference to FIG. 4 and FIG. 7. As shown in FIG. 4, input PS of AB ICAC configuration 1_2_1_4 has an output correspondence ODC of 0100_010. This is only one possible assignment or correspondence ICAC-ODC. Any of the eight alternatives (see FIG. 4, column 404) can be assigned to the 1_2_1_4 ICAC. Every class has a number of ICAC—for example, for class 4_4 this number is seven. Globally, each class can be characterized by a number representing the total possible unique ICAC-ODC assignments for that class. This number is called CLIO (CLass Icac-Odc) in this document. For one class, CLIO is equal to the permutations of all ICAC-to-ODC assignments within that class.

For example, for class 4_4, there are seven ICAC-to-ODC assignments. CLIO for class 4_4 is equal to permutations of the seven ICAC-to-ODC assignments, which is 5,040. This number increases dramatically as the class order increases since the number of ICAC-to-ODC assignments increases. Further, here can be seen the significant impact that using a large m has CLIO increases dramatically as the class order increases (such as for class 18_4), because the larger the class order, the larger the number of ICAC in that class, the larger the number of ICAC-to-ODC assignments, and therefore the larger the number of permutations.

Further, as m increases, the number of classes increases, therefore, for those extra classes which are by definition high order classes, the number of ICAC is larger and larger as the class order increases, with the same consequences as described above.

Each class is independent in term of its own ICAC-to-ODC assignments and permutations, therefore, each class has its own characteristic CLIO number. Multiplying all the CLIO numbers for all classes, generates a global CLIO number characterizing the encryption space for this first encryption variable. This number is called GCLIO for the rest of this disclosure, and is not going to be detailed here, in this disclosure, because the calculations are too involved and are not relevant in term of disclosing new matter. The primary message relevant for this disclosure is that this number is extremely large (a first order ballpark number can be for example 10,000 multiplied 29 times with itself, where 29 is the number of classes, for m=1). Again, it can be seen the significant impact on this number that a larger m has.

A very important aspect needs to be outlined. As mentioned above, each class has a CLIO number. The impact on the encryption strength is that, considering the CLIO number as a PS encryption class space and the specific assignment used in one encryption cycle for a PS class as a PS class key, there are as many independent encryption keys as PS classes. For example, there are 29 independent encryption keys for m=1 and 41 encryption keys for m=13. Again, note the power that variable m gives on the encryption strength.

Second encryption variable: The assignment of core identifiers and RODC identifiers to a PS class Focusing on class 4_4 discussed above, any of the 16 core identifiers (see FIG. 7, column 721) can be assigned to class 4_4. Considering all 16 core identifiers, an additional encryption space is created, where this encryption space is equal to permutations of 16. This encryption space defines all possible core-identifier assignments specific to one given encryption cycle. This encryption space is called PCI (Permutations of Core Identifiers) for the rest of this disclosure.

Similarly to creating a PCI space, an encryption space can be created through permutations of the RODC. As mentioned, the RODC are used as identifiers for upper PS classes (class 15_4 and above). The number of RODC used for these upper classes is detailed with reference to FIG. 5, column 504 and the worth factor, column 505. Such an encryption space, when created, has two flavours:

Within the RODC used for one class. The upper classes use multiple RODC for one class as identifiers, compared to lower classes that use one core identifier for the entire class. Therefore, for the upper classes, an encryption space can be defined for every such upper class, by permutating the RODC used within that class and then multiplying those permutations for all upper classes to create a global variable.

Within the total RODC, groups of specific RODC are assigned for each upper class. Since each upper class requires a set, or group of RODC as identifiers, by varying such set assignments, an incommensurable encryption space is created. It must be noted that the size of this encryption space is implied as "incommensurable" by the large number of RODC and therefore the resulting number of possibilities to create said set assignments.

Third encryption variable: permutations of RI

As mentioned, the 29 PS classes (for m=1) have 148 RI, in 18 classes, with each class having a well-defined number of RI members. Within each of these classes of RI, permutations of the constituent RI members of that RI class can be performed, generating an encryption space.

Similarly to the discussion at CLIO above, there are 18 RI encryption keys, each with a variability factor equal to the permutations of the constituent RI within each class, and where these 18 variability factors are multiplied leading to a global RI variability factor (GRIF).

Totally, the variability factor of all three encryption variables discussed above can be named Global PS Alternatives, or GPSA, as used for the rest of this disclosure.

The GPSA number is a multiplication of GCLIO, PCI, and GRIF. The number coming from RODC permutations, called GRODC, can further multiply GPSA. GPSA is an extremely large number, and detailing such a number in this disclosure has no object. For the goal of this disclosure, it is sufficient to state that this extremely large number defines the encryption variability generated by the above disclosed components.

Totally, the space of the encryption keys of all aspects discussed above can be named as Global PS Keys, or GPSK, as used for the rest of this disclosure.

The GPSK number is a sum of CLIO encryption keys, RI encryption keys, to which the RODC encryption keys can be added.

Clearly, the strength of the disclosed encryption consists in the fact that such number of choices is possible, number of choice that represents a pool from which a select number of choices will be used. Even in the lowest encryption strength (m=1), the disclosed encryption can have so much overwhelming variability that can be used.

Third encryption approach: Two adjacent PS and their derivatives can be paired and have a different encryption during one given cycle. There are three aspects here, leading to three encryption variables.

First encryption variable: member assignment within an RI pair class

As described, for m=1 (the lowest encryption strength), when pairing two consecutive RI, 35 RI pair classes (8 to 42) are formed, each class having between 16 and 1276 members.

Similar to the first encryption variable at the second encryption approach, every member within an RI pair class can have a different assignment within that pair. Permutations of these members assignment within each class will create an encryption space for each RI pair class, called, for the rest of this disclosure, CRIPA (Class RI pair assignment).

For example, class 8 RI pair has 25 members, as described. The CRIPA number for class 8 RI pair is permutations of 25. Note that this class is one of the classes with the lowest number of members; for example, class 22 RI pair has 1276 members, therefore the CRIPA number for class 22 RI pair is permutations of 1276.

Multiplying the CRIPA numbers for all 35 RI pair classes, will result in a global encryption space for this first encryption variable, where this global encryption space is characterized by a number, called TRIPA (Total RI pair assignment) for the rest of this disclosure.

Similar to the discussion at first encryption variable at the second encryption approach, every RI pair class represents an independent encryption key, so, for the lowest encryption strength (m=1) there are 35 independent encryption keys (8 to 42). The number of such independent encryption keys increases strongly with m (in accordance to the number of RI pair dependence on the number of PS classes, respectively on the number of m, as detailed).

Second encryption variable: RI pair header permutations

As exemplified above, class 4 RI pair is described in the format 000_xxxxx. The 000_prefix is the equivalent of a core identifier as defined for PS classes. This prefix is called a header for RI pair classes. There are eight such headers (000_ to 111_), which, when permutated, create an encryption space called RIHP (RI pair header permutations). The characteristic number associated to RIHP is permutations of 8.

The third encryption variable: permutations of RI2

As described, pairing RI lead to 39 RI2 classes (from 4 to 42), where each of these classes has a number of members. Within each of these classes of RI2, permutations of the constituent RI2 members of that RI2 class can be performed, generating an encryption space.

Similarly to the discussion at RI above, there are 39 RI2 encryption keys, each with a variability factor equal to the permutations of the constituent RI2 within each class, and where these 39 variability factors are multiplied leading to a global RI2 variability factor (GRI2F).

Totally, the variability factor of all three encryption variables discussed above can be named Global RI pair Alternatives, or GRIPA, as used for the rest of this disclosure.

The GRIPA number is a multiplication of TRIPA, RIHP, and GRI2F. GRIPA is an extremely large number. For the goal of this disclosure, it is sufficient to state that this extremely large number defines the encryption variability generated by the above disclosed components.

Totally, the space of the encryption keys of all aspects discussed above can be named as Global RI pair Keys, or GRIK, as used for the rest of this disclosure.

The GRIK number is a sum of RI pair encryption keys and RI2 encryption keys.

Clearly, the strength of the disclosed encryption consists in the fact that such number of choices is possible, number of choice that represents a pool from which a select number of choices will be used. Even in the lowest encryption strength (m=1), the disclosed encryption can have so much overwhelming variability that can be used.

Fourth encryption approach: An encryption cycle can be repeated unlimited times.

The above GPSA and GRIPA numbers are multiplied to give the global number of encryption alternatives for one cycle, number also referred to as GNAC for the rest of this disclosure.

The above GPKA and GRIK are added to give the global number of encryption keys for one cycle, number also referred to as GKC for the rest of this disclosure.

As shown, GNAC and GKC depend on m.

First encryption approach defines the impact of m on the encryption strength, second and third encryption approach defines the GPSA respectively GRIPA encryption spaces and GPKA respectively GRIK encryption keys where all GPSA, GRIPA, GPKA and GRIK are influenced by m.

The fourth encryption approach acts as follows:

As mentioned, any number of encryption cycles can be applied.

Every cycle generates a GNAC and a GKC. Every cycle can have a different m.

If for example there are three encryption cycles being engaged, and each encryption cycle generates GNAC_1, GNAC_2, GNAC_3, and GKC_1, GKC_2, and GKC_3, then two final numbers are generated, characterizing the total encryption strength:

Final encryption strength number, or FESN, which is equal to the sum of GNAC generated by each cycle, i.e. GNAC_1+GNAC_2+GNAC_3.

Final encryption key number, or FEKN, which is equal to the sum of GKC generated by each cycle, i.e. GKC_1+GKC_2+GKC_3.

FESN and FEKN represent the available encryption space for the disclosed DED. Any encryption within this space maintains the size of the encrypted file to be the same as the original file size.

In order to perform any encryption within the FESN/FEKN space, the following need to be specified:

a. Variable m b. One global, PS alternative choice within the number of GPSA/GPKA space c. One global RI pair alternative choice within the number of GRIPA/GRIK space d. Number of cycles All these form a binary word. Given the very large number of alternatives in the spaces at b and c above, this binary word can be in the thousands of bits, if all alternatives in the two spaces are desired to be represented. Applications, users, or devices can have a set of these binary words for use, and these can be sequentially referred to with a lower number of bits. For example, one application/user/device can have say 128 binary words from the full space (each binary word say of 32768 bits), and the respective application/user/device can call any of the 128 binary words of 32768 bits each with only 7 bits. Note that the encryption space remains untouched—the said lower number of bits to represent said set of binary words in use only refers to how much of the full space is desired to be used in a given application/user/device. The encryption strength remains the same, because a third party would not know what the 128 binary words in use are, but more on this is disclosed below. Note that the set of binary words in use can also be adaptive and be changed using a specific method that may include a deterministic measure such as the date and time of use, as also disclosed below.

A binary word in use is called in this disclosure a global encryption key (GEK). GEK should not be confused to GPKA, GRIK, GKC, or FEKN, as indicated very clearly by their definitions.

Continued in Part-2
File Required to be Broken in Two Parts at Submission Due to an Error→No Files More than 26 MB Accepted
Continued from Part-1
File Required to be Broken in Two Parts at Submission Due to an Error→No Files More that 26 MB Accepted The DED method disclosed here can be implemented in software or in hardware. There are two main differences of focus between the hardware and software implementations, the first one being the memory needs and the second one being the security level of a communication between a sender and a receiver.

Regarding the first difference, the memory needs. An example is being considered, to make the point.

As described for the first encryption variable of the second encryption approach, for class 4_4, there are seven ICAC-to-ODC assignments. CLIO for class 4_4 is equal to permutations of the seven ICAC-to-ODC assignments, which is 5,040. To cover this, in a classic direct approach, 5,040 memory locations of 22 bits each would be required. The 22 bit specification represents the maximum word size for a PS class allocation, as explained, and this maximum size is used for all PS classes.

As mentioned above, the above described encryption space and memory need is just for one key out of the total GKC keys in one encryption cycle. If all keys in the GKC space would be implemented classic, the memory needs would exceed the doable limits at present time in a hardware implementation, and would be possible, but challenging in a software implementation. A solution for such classic implementation is to limit the GKC space within one application or user or device, and in this case, the implementation becomes challenging for a hardware implementation and perfectly doable for a software implementation.

In this disclosure however, a solution that makes both hardware and software implementations perfectly doable from the memory needs point of view while covering the entire encryption space in every application/user/device, is disclosed next.

Regarding the second difference, the security level of a communication between a sender and a receiver As will be disclosed next, a hardware implementation is more secure than a software implementation, but using the disclosed embodiments, both hardware and software implementations reach a high security level.

The solution mentioned above for the first difference, namely to make both hardware and software implementations perfectly doable from the memory needs point of view while covering the entire practically unlimited encryption variability space in every application/user/device, is disclosed next. The hardware implementation is detailed, and then parallel to the software implementation is made. An example is provided to exemplify this disclosed solution.

The hardware implementation will not consist only of memory to store all the variability in the encryption space, to cover all the encryption space described above-such amount of memory is not doable. Instead, the hardware implementation will consist of memory and a specialized controller.

The memory will contain only the standard allocation for PS, RI, RI pair, RI2, and other encryption spaces and keys described above. Standard allocation equates to the basic, non-permutated assignments for each of the above, as described. As outlined across the disclosure, for m=1, the necessary memory is less than 500k in total (with different word length for PS, RI, RI pair, RI2, or other). For m=13, the necessary memory increases to about 500M. Solutions to the memory requirements exist for m larger than 13, solutions that may imply a larger cost, or a slower speed, solutions that may employ off-chip memory.

The specialised controller will derive the PS, RI, RI pair, RI2 and other allocation that corresponds to the GEK encryption key that is currently in use, by using as reference the standard allocation that is stored in the memory described above. For example:

As described for the first encryption variable of the second encryption approach, for class 4_4, there are seven ICAC-to-ODC assignments. CLIO for class 4_4 is equal to permutations of the seven ICAC-to-ODC assignments, which is 5,040. To cover this, in a memory-only implementation, 5,040 memory locations of 22 bits each would be required. The 22 bit specification represents the maximum word size for a PS class allocation, as explained, and this maximum size is used for all PS classes.

By specifying in the GEK which permutation of seven ICAC-to-ODC is used in the current encryption cycle, the 5,040 memory locations can be saved, as follows:

The specialised controller mentioned above will read the information pertaining to which permutation is used in the current encryption cycle from GEK. This information can be represented by a 13 bits word, to cover the 5,040 space.

The specialised controller then will read from the standard memory, the seven standard allocation words of 22 bits each.

Out of these seven words and the 13 bit word, the specialised processor will create the corresponding seven word assignment corresponding to the permutation being used in the current cycle.

The seven word assignment that has been determined by the specialized controller, is written in an operational memory, operational memory that is used to encrypt the IFDS for the current cycle.

The GEK encryption key for the current cycle similarly has a binary word (similar as the 13 bit word described above) for every PS class, RI class, RI pair class, RI2 class, and other encryption variables described above.

These binary words will have appropriate size function of which encryption variable needs to be covered. For example, a much larger number of bits will be needed to cover which permutation is in use out of the permutations of 1276 necessary for class 22 RI encryption space. But this is perfectly doable and represents no issue.

The specialized controller will read and interpret each and every of these binary words for all the above described encryption key spaces that are assembled in the GEK encryption key, and write the full operational memory that represents the GEK encryption key. This operational memory will have sections for each of the encryption key spaces described above.

Accordingly, an operational memory of the size equal to the original standard allocation memory is created by the specialised controller, by interpreting the GEK key.

Consequently, full coverage of the entire encryption space is possible, with the cost of only two standard allocation memory spaces and a specialized controller.

The penalty is the time that the specialized controller takes to interpret the GEK key and to create the operational memory, which is a RAM memory, as compared to a ROM memory for the standard allocation memory that is used as reference. This penalty is a one-time event per encryption cycle, no matter how big the IFDS that is being encrypted is.

It must be noted that this penalty time is visible to a user only for the first encryption cycle, or the first IFDS if the data stream contains multiple IFDS. That is because once a GEK encryption key is decoded and the operational memory is created, the encryption of the IFDS is performed using the created operational memory. In the time when the encryption of the IFDS is performed, the next GEK encryption key is decoded and the next operational memory is created by the specialized controller, and this processed is not visible to the user, being a parallel processor to the visible IFDS encryption process.

Finally, it must be noted that this solution disclosed here, will require therefore a specialized controller with the function as described above, a ROM memory for the standard allocation as described, and two RAM operational memories of the same size as the standard allocation ROM memory, where the said size of the memory depends on variable m.

The solution mentioned above for the second difference, namely to make both hardware and software implementations reach a high security level of a communication between a sender and a receiver, is disclosed next. The hardware implementation is detailed, and then parallel to the software implementation is made. An example is provided to exemplify this disclosed solution.

The challenge for the hardware implementation is how to preserve the highest level of security. In other words, this means how to communicate the encryption keys (GEK) between the sender and the receiver, so that the receiver is able to decrypt the information encrypted by the sender. This is essential, because the GEK keys are dynamic, and if the GEK keys are sent over the communication channel, even if they are sent encrypted, this would represent a security risk. The practical implementation, disclosure here, is as follows:

1 Every chip, or device, will have a unique ID, from the factory. This unique ID is public, i.e. is communicated as part of the communication protocol between the two devices involved in the communication (i.e. the receiver and the sender), at the start of the communication.

2 From the factory, each device has, hardwired, what is the template of the encryption protocol and sequence that is going to be used between that device only and every other device, function of that other device ID.
   a. This hardwired encryption protocol and sequence represents a sequence of GEK keys.
   b. The only possibility for a security breach to be successful is to have the hardwired specifics for the two specific devices engaged in the communication, in addition to the receiver ID and the sender ID, in order to intercept the communication. Since the sender and the receiver ID is communicated on the communication channel, a successful security breach must have the hardwired content defining the communication between the two devices engaged in communication—and this information is only available from the chip manufacturer, or from the two devices involved in communication. Obviously, a third party trying to breach in would not have the two devices to have the hardwired content, therefore the only way to have that content is from the chip manufacturer. More on this below.

3 Variations on this approach are possible, such as the sender and the receiver may know each other's device ID, therefore these are not transmitted anymore through the communication channel, adding an additional lever to the security.

4 Other enhancements are possible, such as:
   a. Use of additional security keys, encrypted or not, but all these would require transmission or communication between sender and receiver, directly on the communication channel or indirectly through other means. These, theoretically, can be intercepted, so, for high security applications this may not be the best option to use. Of course, since the hardwired hardware specifics of the two devices are not available, intercepting these additional security keys will not imply a breach, but since these additional security keys can be intercepted, these additional security keys would not bring a major advantage either.
   b. Another possible enhancement can be that the hardwired specifics are skewed, or altered, by deterministic non-transmissible information, such as the communication date/time, outside temperature, information that can be determined by both devices engaged in the communication, information that has enough variability that will prevent a third party to timely determine it.
   c. Further, such deterministic information can be uniquely processed to create a skewed encryption key to alter the hardwired specifics, where this unique process applied to the deterministic information to generate the skewed encryption key is similarly hardwired to be unique between specific two devices. This is useful, because it permits to vary the encryption keys between two devices as a function for example of the time that the communication takes place at.
d. Concluding, the practical implementation, proposed above, has as the only possible security breach to have the hardware specifics for two very specific devices from the chip manufacturer. Since a third party that would want to breach a communication would not know apriori which is the device IDs of the two devices engaged in the communication of interest, it means that this third party must have the hardware specifics for all devices that were manufactured by the chip manufacturer. While compromising the chip manufacturer and obtaining such information is possible, such an event is highly unlikely, and in addition, an event of such magnitude would be known by all users that their communication may be compromised.

5 Additional observations:
  a. The manufacturer implements the very specific encryption protocol and sequence of one device that is going to be used with another device only, as a template. This template will include, as mentioned, a sequence of GEK keys. This template is repeated for every communication, transmission, etc, between those two devices, unless a skewed encryption key is generated preferably as described at 4.c above, or more general is skewed with deterministic non-transmissible information, or with transmittable custom entries or security keys as also described.
  b. The manufacturer can hardwire the above named protocol and sequence for devices that have been fabricated, but can hardwire this for devices that will be fabricated as well by generating IDs for devices that will be fabricated, in advance. Such hardwire can be implemented as a ROM, or even more secure, as a circuit. In case of a major event at the manufacturer as described at 4.d above, event that would compromise the security of devices, the manufacturer can recall the devices and update the ROM content.
  c. If the number of fabricated devices exceeds the number of IDs that were predicted for future manufacture and hardwired in one device, for those devices for which an ID was not hardwired, a generic protocol and sequence will be used, warning the device owner. The keys for this generic protocol and sequence are still hardwired, so they are not transmitted on the communication channel, but since these are not device specific, the keys are less secure (easier to be determined by a security breach, since they are used for multiple devices).
  d. Non-device specific keys are also used by one transmitter to multiple receivers, such as a TV station broadcasting encrypted to multiple subscribers.
  e. Non-device specific keys can be used also by any transmitter to any receiver by default, in a regular, less secure communication, even when the respective transmitter and receiver have valid IDs. In between such devices, the more secure device-specific communication can be activated by the user, on demand.
  f. As mentioned, the implementation means to hardwire all the said device specific keys can be for example in a device specific ROM.

Brief notes on the memory needs and security level aspects in a software implementation.
  1 For the memory needs aspect, this is by no means an issue in a software implementation. The controller from the hardware implementation can be conveniently replicated in a software implementation, for an equivalent functionality.
  2 For the security level, an equivalent software implementation to the hardware implementation can also be implemented.
    a. Every software installation on every device will have an ID, which behaves similar to the hardware device ID
    b. The hardwired template of the encryption protocol and sequence between two unique, specific devices, will be part of the software package, and is unique to the software installation for that specific ID.
    c. These two aspects will create an equivalent behaviour of the device on which this software installation resides. A breach will require the template of the encryption protocol and sequence that is specific for the specific device/installation, and this can be obtained, similarly from the software manufacturer. However, the fact that it can also be a software vendor involved, as well as the fact that software can be breached, would make a software implementation less desirable for high security applications as compared to a hardware implementation.
    d. All other considerations for a software implementation are equivalent to the considerations detailed for the hardware implementation.

Comparing the two implementations, it is clear that a software implementation is much more convenient and lower cost for most applications, including consumer applications, while a hardware implementation is the best option for applications where security cannot be compromised with, such as for military applications or high security communications.

Figure 11:
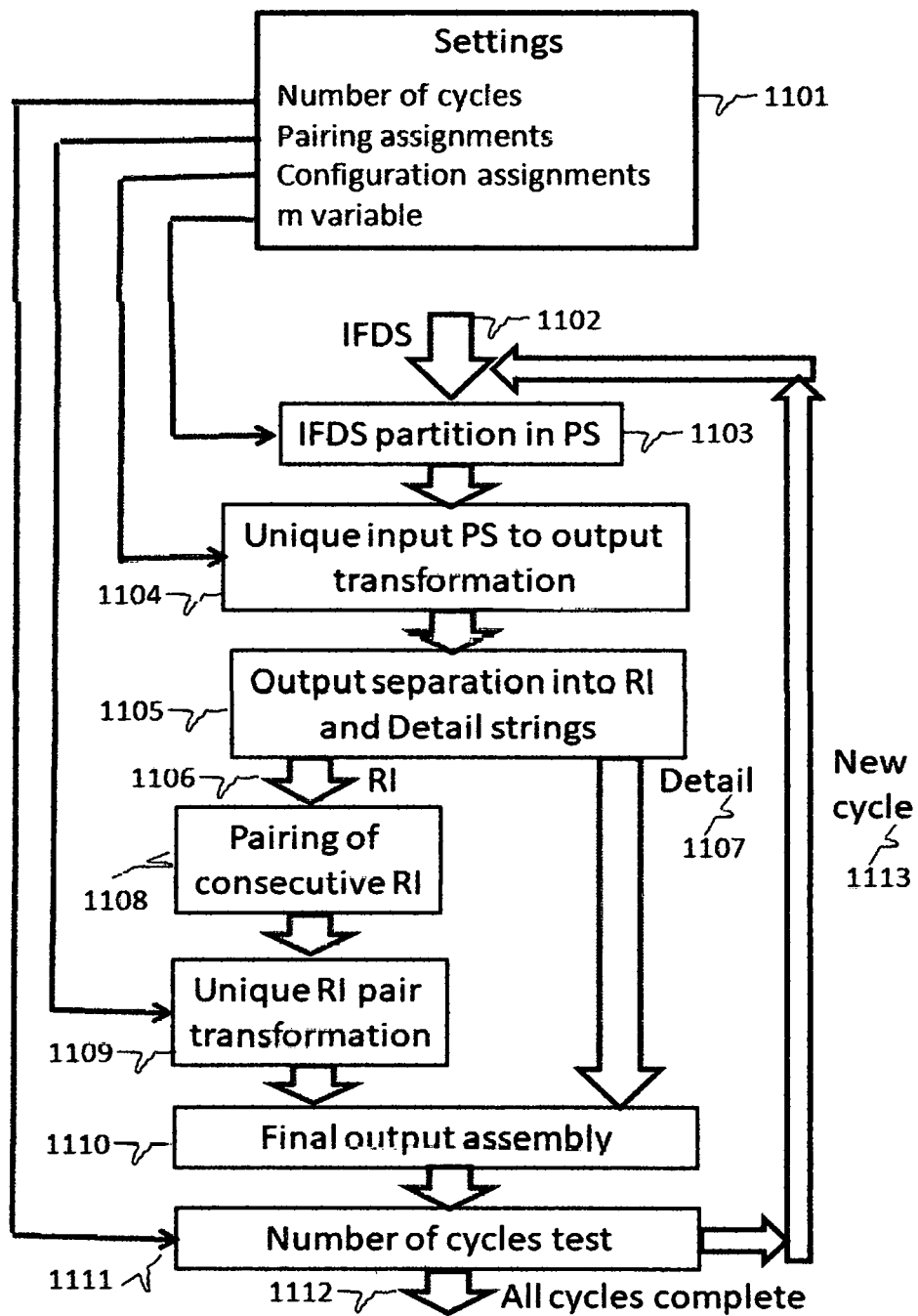
FIG. 11 is used to introduce, describe, and illustrate the flow, implementation, and suggested hardware architecture used for encryption, in accordance to one or more of the embodiments

In both cases, software or hardware, the encryption flow described in FIG. 11 applies. Next, applicable to both software and hardware implementations are outlined, with hardware specifics highlights. In both implementations, the settings, at 1101 in FIG. 11, are already derived as discussed above with hardware and software specifics. Essentially, the 1101 settings are derived by the specialized controller that decodes the GEK encryption key and writes the operational RAM memory. The GEK encryption keys correspond to the hardwired communication protocol between two specific devices engaged in the communication, as explained above. In the encryption flow described below, the derivation of the 1101 settings are considered complete, using a procedure as described above. Therefore, only the encryption flow of the IFDS is described next.
  1 The input data string to be encrypted is outlined as 1102
    a. For hardware implementation, this data is preferably received on a 32 bit data bus
  2 The first encryption setting out of the 1101 settings to be used, is the m variable. This variable sets the maximum PS length, as detailed above. Based on m, the IFDS is partitioned in PS, at 1103.
    a. In hardware implementation, this step is implemented using a specialized controller 3 Every PS is transformed into a unique corresponding output at 1104, using the second encryption setting, the configuration assignments.
   a. In hardware, this transformation is performed using the corresponding part of the operational memory derived after the decoding of the GEK encryption key, where the PS is the address, and the memory output corresponding to that address is the unique corresponding output. This operation is performed by a specified controller.
4 The encrypted output from 1104 is divided into RI (1106) and Detail (1107) strings at 1105. Consecutive RI are paired at 1108.
   a. All these steps are implemented in hardware using a specialized controller.
5 Every pair of consecutive RI is transformed at 1109, using the third encryption setting, the pairing assignments.
   a. The highlights here are similar to the PS transformation highlights at 1104. This part of the flow is using another part of the operational memory, derived after the decode of the GEK encryption key, where this part of the operational memory details the RI pair and RI2 assignments.
6 The encrypted RI pairs together with the original corresponding details are assembled at 1110. The preferred assembling is that each encrypted pair is followed by the corresponding details of the two RIs in the pair.
   a. In term of hardware, this assembly is implemented through a specialized controller.
7 The number of completed cycles is compared to the number of cycles in the encryption settings (the last of the four encryption settings), at 1111.
   a. If the comparison generates a true value, the final data is ousted at 1112.
   b. If the comparison generates a false value, a new cycle starts, by returning the output encrypted data from the current cycle, on path 1113, to the input.
   c. The new cycle may implement a full set of settings specified again at 1101. It may also implement a partial set of settings, such as only the pairing assignments may change from the previous cycle. In any case, as explained, a new operational memory is used after being derived for the new cycle, as explained above.
   d. In hardware, this is implemented by a specialized controller.
8 As mentioned, the GEK encryption keys used for the encryption cycle(s) are not transmitted over the communication channel. They are part of the hardwired security settings of the communication between two devices, as explained.

Figure 12:
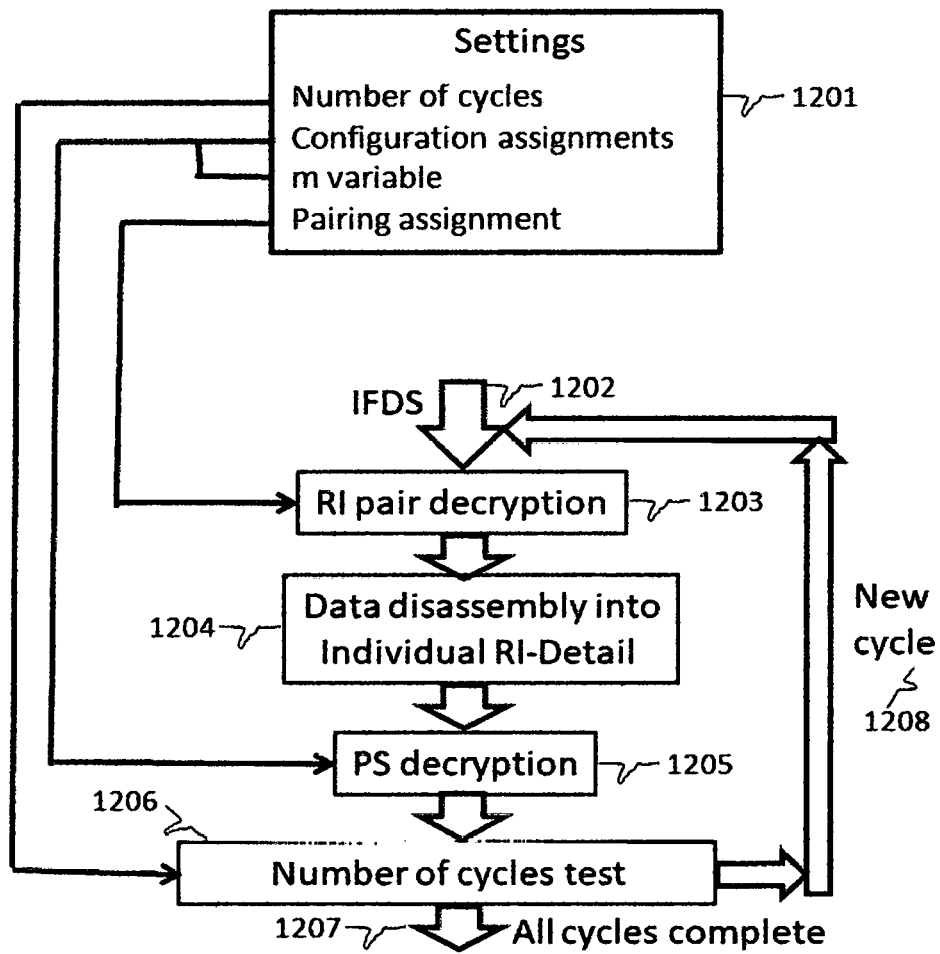
FIG. 12 is used to introduce, describe, and illustrate the flow, implementation, and suggested hardware architecture used for decryption, in accordance to one or more of the embodiments

The decryption flow and hardware implementation, depicted in FIG. 12, is dual to the encryption flow and hardware implementation.

1 The receiver device has the protocol to communicate to a specific sender device hardwired, as detailed above. In other words, the received decodes the GEK keys used by the sender, in order to perform the decryption, and writes the operational memory in 1201. All these processes and steps have been already detailed above.
2 The fully encrypted data is received at 1202. The first priority to decrypt the received data is to recognize the encrypted RI pairs (RI2 first, then RI pairs). In order to fulfil this task, a multitude of settings (not shown in FIG. 12 in order to keep the figure legible) are required:
   a. Variable m is required because it will indicate how many PS classes, therefore how many RI exist
   b. Configuration assignments are required, in order to indicate the meaning of each RI
   c. Pairing assignments are required, to indicate the content of each pair
      i. In hardware, the a, b, c, settings above are interpreted by a controller.
3 Using the a, b, and c above, the decryption of the RI2 and RI pair, at 1203, is performed using the corresponding part of the derived operational memory over the written structure of the encrypted data (RI pair followed by detail).
   a. Since it is known therefore that the first thing in the encrypted string is an encrypted RI2/RI pair, and since every encrypted RI2/RI pair is unique given the data at a, b, and c above, the encrypted RI2/RI pair is separated from the string and decrypted.
      i. In hardware, this separation is implemented by a specialized controller. The decryption, as mentioned, is performed using the corresponding part of the operational memory, where the memory address is the encrypted RI2/RI pair together with the m variable and select PS encryption assignment flags, and the memory output is the decrypted RI2/RI pair (i.e., the two RI).
4 The decrypted RI2/RI pair will provide the two constituent RI. Each RI will indicate the number of corresponding bits in the Detail section, therefore Detail is separated from the string for the two RI, and the two encrypted PS are obtained, at 1204.
   a. In hardware, all this is implemented by a specialized controller.
5 The two PS are decrypted at 1205 using two settings: the m variable and the Configuration assignments.
   a. In hardware, this is implemented, similarly to the RI2/RI pair decryption, using a corresponding part of the operational memory, where the memory address is the encrypted PS together with the m variable, and the memory output is the raw input PS.
6 The number of cycles that are completed is compared to the number of cycles in the settings at 1206. If the comparison generates a true value, the final decrypted data is output for use at 1207. If the comparison generates a false value, a new decryption cycle is started by returning the decrypted data from the current cycle, on path 1208, to the input. The new cycle will use, again, the same settings that were used for the encryption based on a new, cycle specific operational memory, as explained above.
   a. In hardware, this is implemented by a specialized controller.

Note that applying an RB transformation to the entire IFDS before the above described processing represents yet another encryption variable, since an RB transformation completely changes the IFDS therefore the encryption outcome. Such RB transformation can be applied for every encryption cycle.

Another important note: the disclosed encryption/decryption method keeps the file size constant in all conditions and for all operations that have been disclosed. Keeping the file size constant is not limiting in any way to the disclosed aspects, i.e. the file size can be compressed or expanded before or during the encryption/decryption process. The key aspect and condition when a compression or expansion of data is performed is that this process of expansion compression preserves the uniqueness correspondence of the data so that the decryption uniquely restores encryption process to the initial data.

The applications of the disclosed DED method, when is implemented either as hardware or software, are countless. Some examples are provided just to outline the possibilities:
1. Secure audio and video communication, wired and wireless
2. Secure audio and video broadcast
3. "Pay per view" audio and video broadcast
4. Secure data communication
5. Secure data storage From reading the present disclosure, other variations and modifications will be apparent to the skilled person. Such variations and modifications may involve equivalent and other features which are already known in the art or are implied by the embodiments presented in this disclosure. Such variations and modifications may increase the performance of the DED method.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, and reference signs in the claims shall not be construed as limiting the scope of the claims.

The invention claimed is:

1. A method to encrypt an arbitrary binary data string (IFDS) of a first size in term of number of bits that is larger than a minimum size into an output file, and to decrypt said output file back into said IFDS, implemented in hardware using hardware blocks of specific functionality with said implementation integrated in a hardware system based application of broad functionality that requires said data encryption/decryption, and being assigned a unique implementation ID, comprising:
developing a set of unique, reference processing strings (PS) that is stored in a first partition of a first data storage device known as standard allocation memory (SAM) of a first number of storage locations with a first number of bits per each storage location, comprising:
each said PS is unique and has a number of bits of a unique sequence;
said set of PS is organized in a number of PS classes, with each said PS class comprising a number of said PS, with no two said PS classes having said PS of a same number of bits;
each of said unique sequence comprising one of the following:
a first unique sequence comprising of two or more consecutive groups of bits that alternate between 0 logic type and 1 logic type with each of said groups of bits being of a number of bits of one, two, or three bits of same said type and with a last said group in said unique sequence, called delimiter, being of four bits of same said type, in which by adding all said number of bits of all said groups in said unique sequence, a total number of bits that is smaller or equal to a first maximum number of bits is allowed;
a second unique sequence comprising of two or more groups of bits that alternate between 0 logic type and 1 logic type with each of said group of bits being of a number of bits of one, two, or three bits of same said type, wherein by adding all said number of bits of all said groups in said unique sequence, a total number of bits that is equal to said first maximum number minus one, or minus two, or minus three, is allowed;
a third unique sequence comprising a single group of bits of either 0 logic type or 1 logic type, with said single group being of a number of bits greater or equal to four;
developing one or more unique sets that are derived from said set of PS with each of said unique sets being stored in a partition of said SAM, comprising:
a set of primary root identifiers (RI) stored in a second said partition, wherein:
a number of unique said RI are developed for each said PS class, with each said RI having a number of bits of a unique sequence;
said set of RI is organized In a number of RI classes comprising a finite number of said RI with no two said RI classes having said RI of same number of bits;
a set of detail, stored in a third said partition, wherein:
each said detail has a number of bits;
each said detail follows a said unique RI such that said number of bits of said unique RI plus said number of bits of said detail equals said number of bits of a said unique PS;
said set of detail is organized in a number of detail classes comprising a finite number of said detail with no two said detail classes having said detail of same number of bits;
a set of pairs of said RI, known as a set of RI pairs, stored in a fourth said partition, wherein:
each said RI pair is unique and has a number of bits of a unique sequence;
each said unique RI pair is formed by pairing two unique said RI;
said set of RI pairs is organized in a number of RI pair classes comprising in a finite number of said RI pairs, with no two said RI pair classes having said RI pairs of same number of bits;
a set of root identifiers for said RI pairs, knows as a set of RI2, stored in a fifth said partition, wherein:
a number of unique said RI2 are developed for each said RI pair class, with each said RI2 having a number of bits of a unique sequences;
said set of RI2 is organized in a number of RI2 classes comprising a finite number of said RI2 with no two said RI2 classes having said RI2 of same number of bits;
a said unique RI pair is formed by a said unique RI2 followed by a group of number of bits called alternative, with said number of bits of said unique RI pair being equal to said number of bits of said unique RI2 plus said number of bits of said alternative;

with said RI, detail, RI pair, RI2, aggregately being called binary constructs, said RI classes, detail classes, RI pair classes, RI2 classes, aggregately being called classes, and said set of RI, set of detail, set of RI pair, set of RI2, aggregately being called sets;

aggregating said first, second, third, fourth, fifth partitions in a first storage bank of a second number of said storage locations, and developing one such storage bank that is part of said SAM for each value of a variable known as variable m, with said value being between one and a maximum value greater or equal to one, in which said first maximum number of bits of a PS in said first partition is assigned to be directly proportional to said value of said variable m;

interpreting an encryption/decryption key consisting of a total number of bits comprising a first number of bits to specify a said value of said variable m indicating a said bank used for encryption/decryption, a second number of bits to specify one or more of said sets within said bank that are modified for said encryption/decryption, a third number of bits to specify, within each of said sets specified by said second number of bits, one or more of said classes that are modified for said encryption/decryption, a fourth number of bits to specify within each of said class specified by said third number of bits, permutations that are performed among said binary constructs of said class to modify said class for encryption/decryption, with sa id interpreting being implemented using a first specialized functionality of a specialized controller (SC);

writing a second data storage device, known as operational memory (OM), in accordance to said interpreted encryption/decryption key, by employing a second specialized functionality of said specialized controller, comprising:
  copying a said bank as specified by said first number of bits of said encryption/decryption key, from said SAM into said OM;
  within said bank, modifying said one or more sets as specified by said second number of bits, with said modifying referring to modifying one or more said classes as specified by said third number of bits;
  within each of said one or more sets, modifying said one or more of classes as specified by said third number of bits, with said modifying referring to performing permutations among said binary constructs of each said class as specified by said fourth number of bits;
  within each of said one or more classes, modifying said class by performing said permutations among said binary constructs of said class as specified by said fourth number of bits, comprising reading said binary constructs and creating an order log of said storage locations of said binary constructs for said read, applying said permutations, and writing back said permutated binary constructs at same said storage locations as In said storage location order log, such that when same storage location of a specific said binary construct of a said class is read from said SAM called first read and from said OM called second read, a said first read to a said second read correspondence is the encryption of said specific binary construct, and a said second read to a said first read correspondence Is the decryption of said specific binary construct;

performing a group of operations to encrypt a said IFDS, producing one or more levels of encryption hierarchy, with said operations being implemented by said specialized controller through said specialized functionality, comprising:
  partitioning said IFDS in a series of consecutive of said processing strings using said set of PS that are defined in accordance to said variable m for said OM bank, by accessing said first partition and recognizing a said PS in said IFDS, such creating said series of consecutive PS that occur in said IFDS, with every said consecutive PS receiving a first order number alternating as either odd or even with a first PS in said IFDS being odd, and such creating a first level of encryption hierarchy comprising in encrypting said PS in accordance to said specifying a said bank;
  transforming every said consecutive PS immediately as it is said partitioned in accordance to said partitioning said IFDS step, said transforming being into corresponding said RI and said detail by accessing said second and third partition for each said consecutive PS, with said corresponding RI and detail receiving same first order number as said consecutive PS, with said transformation being in accordance to said first read to said second read correspondence of said second respectively third partitions, creating a second level of encryption hierarchy comprising in encrypting said RI and said detail that uses said first level of encryption hierarchy represented by said encrypted PS;
  creating said RI pairs out of said encrypted RI of every two said odd and even consecutive PS in said IFDS immediately as they are said transformed in accordance to said transforming step, with said detail of said two RI in said RI pair creating a detail pair attached to said RI pair and with each detail preserving said first order number, and with said RI pair further accessing said fourth partition in accordance to said first read to said second read correspondence, creating a third level of encryption hierarchy consisting in encrypting said RI pairs that use said second level of encryption represented by said encrypted RI; and
  assigning to every said RI pair, immediately as it is created by said creating said RI pairs step, a said RI2, by accessing said fifth partition, with said RI2 assignment being in accordance to said first read to said second read correspondence of said fifth partition, with said alternative of said RI2 being attached to said RI2, creating a fourth level of encryption hierarchy comprising in encrypting said RI2 that uses said third level of encryption represented by said encrypted RI pairs;
  wherein said minimum size of said IFDS comprising said number of bits of two, said odd and even, consecutive PS;
  generating an output file representing said encrypted IFDS, comprising:
    writing in said output file, immediately as said RI2 is said assigned in accordance to said assigning to every said RI pair step, said RI2, said attached alternative, followed by said detail pair, for every said odd and even sequential PS for all said IFDS;

calling that an encryption cycle is completed once said output file is generated;

writing said implementation ID in said output file, and erasing said OM; and performing a group of operations to decrypt a said output file, decrypting one or more levels of encryption hierarchy, with said group of operations being implemented by said specialized controller through said specialized functionality, the group of operations comprising:

decrypting said fourth level of encryption hierarchy, comprising:

locating in said output file a said RI2, by accessing said fifth partition in said OM;

decrypting said located RI2 in accordance to said second read to said first read correspondence of said fifth partition;

decrypting said third level of encryption hierarchy, comprising:

restoring an RI pair by accessing said fourth partition in said OM using said decrypted RI2 and said alternative attached to said RI2 during said assigning to every RI pair encryption step;

decrypting said restored RI pair in accordance to said second read of said first read correspondence of said fourth partition;

assigning an odd number to first RI in said decrypted RI pair and an even number to second RI in said decrypted RI pair;

decrypting said second level of encryption hierarchy, comprising:

matching said odd number RI in said decrypted RI pair to said odd number detail of said detail pair created during said creating said RI pair encryption step by accessing said second and third partitions of said OM, and similarly matching said even RI with said even detail;

decrypting said matched odd Ri-detail and said even RI-detail in accordance to said second read to said first read correspondence of said second and third partitions, with said decrypted RI and detail preserving said odd and even numbers;

decrypting said first level of encryption hierarchy and generating said decrypted IFDS, comprising:

restoring every said PS in said IFDS in accordance to said variable m represented by said OM bank by matching said odd respectively even decrypted Ri-detail with an odd respectively even PS by accessing said first partition;

generating said IFDS by writing in said IFDS every said restored odd respectively even PS in odd followed by even order, for all said output file;

calling that a decryption cycle is completed once said IFDS is generated, and erasing said OM.

2. A digital system designed to both encrypt any arbitrary binary input data string (IFDS) of a first size in term of number of bits that is larger than a minimum size into an output file, and to decrypt said output file back into said IFDS, implemented in hardware using hardware blocks of specialized functionality that are self-contained within said digital system, with said implementation integrated in a hardware system based application of broad functionality that requires said data encryption/decryption, and with said implementation being assigned a unique implementation ID, comprising:

a first said hardware block known as standard allocation memory (SAM), of a first number of storage locations each being of a first number of bits, storing standard allocation content that never changes;

said SAM is organized in a number of storage banks, comprising:

each said bank is allocated for a value of a variable known as variable m with said value being between one and a maximum value greater or equal to one; and each said bank is allocated a second number of said storage locations that is divided between a first number of partitions, with said first number of partitions being the same for every said bank, comprising:

a first partition of a third number of said storage locations, storing a set of processing strings (PS), wherein:

each of said PS is unique, comprising a number of bits of a unique sequence; and said set of PS is organized in a number of PS classes comprising a finite number of said PS with no two said PS classes having said PS of a same number of bits;

each of said unique sequence comprising one of the following:

a first unique sequence comprising of two or more consecutive groups of bits that alternate between 0 logic type and 1 logic type with each of said groups of bits being of a number of bits of one, two, or three bits of same said type and with a last said group in said unique sequence, called delimiter, being of four bits of same said type, in which by adding all said number of bits of all said groups in said unique sequence, a total number of bits that is smaller or equal to a first maximum number that is specific to said bank, is allowed;

a second unique sequence comprising of two or more groups of bits that alternate between 0 logic type and 1 logic type with each of said group of bits being of a number of bits of one, two, or three bits of same said type, wherein by adding all said number of bits of all said groups in said unique sequence, a total number of bits that is equal to said first maximum number that is specific to said bank minus one, or minus two, or minus three, is allowed; and a third unique sequence comprising a single group of bits of either 0 logic type or 1 logic type, with said single group being of a number of bits greater or equal to four;

wherein said first maximum number of bits is assigned to be directly proportional to said value of said variable m;

a second partition of a fourth number of said storage locations, storing a set of primary root identifiers (RI);

a third partition of a fifth number of said storage locations, storing a set of detail, wherein:

each said RI having a number of bits of a unique sequence, and each said detail has a number of bits;

each said unique PS is transformed, with said transformation comprising a unique said RI followed by a said detail, with said number of bits of said RI plus said number of bits of said detail being equal to said number of bits of said PS;
a number of said RI is developed for each of said PS classes;
said set of RI comprising all said RI of all said PS classes, and is organized in a number of RI classes comprising a finite number of said RI with no two said RI classes having said RI of a same number of bits; and
said set of detail comprising all said detail of all said PS, and is organized in a number of detail classes comprising a finite number of said detail with no two said detail classes having said detail of a same number of bits;
a fourth partition of a sixth number of said storage locations, storing said transformation of every PS into said unique RI and said detail;
a fifth partition of a seventh number of said storage locations, storing a set of said Ri pairs, wherein:
every said RI pair is formed by putting together twosaid unique RI, with each of said RI pair comprising a number of bits of a unique sequence;
said set of RI pairs is organized in a number of RI pair classes comprising a finite number of said RI pairs with no two said RI pair classes having said RI pairs of same number of bits; and
each said RI pair comprising a unique root identifier for said RI pair known as RI2 followed by an alternative, with the number of bits of said RI2 plus the number of bits of said alternative being equal to said number of bits of said RI pair;
a sixth partition of an eighth number of said storage locations, storing a set of said RI2, wherein:
a number of unique said RI2 is developed for each of said RI pair class;
said set of RI2 comprising all said RI2 of all said RI pair classes, and is organized in a number of RI2 classes comprising a finite number of said RI2 with no two said RI2 classes having said RI2 of a same number of bits;
a seventh partition of a ninth number of said storage locations, storing a set of said alternatives, wherein:
said set of alternatives comprising all said alternatives for all said RI pairs, and is organized in a number of alternatives classes comprising a finite number of said alternatives with no two said alternatives classes having said alternatives of a same number of bits; and
an eighth partition of a tenth number of said storage locations, storing, for each said RI pair, said unique RI2 and said alternative;
with said RI, detail, RI pair, RI2, alternatives, aggregately being called binary constructs, said RI classes, detail classes, RI pair classes, RI2 classes, alternatives classes, aggregately being called classes, and said set of RI, set of detail, set of RI pair, set of RI2, set of alternatives, aggregately being called sets;
a second said hardware block known as operational memory (OM), storing one of said banks copied from said SAM and modified for encryption/decryption, wherein:
said bank is first modified by permutating said binary constructs of one or more of said classes of one or more of said second, third, fifth, sixth, and seventh partitions of said bank, comprising:
reading said binary constructs of said class and creating an order log of said storage location of each said binary construct;
applying permutations among said read binary constructs of said class; and
writing back said permutated binary constructs of said class at same said storage locations as in said storage location order log, such that when same storage location of a specific said binary construct of a said class is read from said SAM called first read and from said OM called second read:
a said first read to a said second read correspondence is the encryption of said specific binary construct; and
a said second read to a said first read correspondence is the decryption of said specific binary construct;
said bank is second modified by updating said binary constructs from said fourth partition with said first modified binary constructs of said second and third partitions, and by updating said binary constructs from said eighth partition with said first modified binary constructs of said sixth and seventh partitions, comprising:
reading every said RI and detail of said fourth partition;
updating said fourth partition by using a said first read to said second read correspondence in said second partition for every said read RI, and in said third partition for every said read detail, with said updated fourth partition storing encrypted said RI and detail;
reading every said RI2 and alternative of said eighth partition; and
updating said eighth partition by using a said first read to said second read correspondence in said sixth partition for every said read RI2 and in said seventh partition for every said read alternative, with said updated eighth partition storing encrypted said RI2 and alternative; and
a third said hardware block, known as specialized controller (SC) of specialized functionality, comprising:
a first group of said specialized functionality, applicable to both encryption and decryption, comprising:
a first said encryption/decryption functionality of interpreting an encryption/decryption key of a total number of bits, with said interpreting being used for said copying a said bank from said SAM into said OM, and for said modifying said copied bank in said OM for encryption/decryption, comprising:
a first number of bits of said total number of bits of said encryption/decryption key is specifying a said value of said variable m, i.e. is specifying said bank copied from said SAM into said OM and used for encryption/decryption;
a second number of bits of said total number of bits of said encryption/decryption key is specifying one or more of said partitions that are being modified within said OM bank;
a third number of bits of said total number of bits of said encryption/decryption key is specifying one or more of said classes that are being modified within each of said specified partitions; and a fourth number of bits of said total number of bits of said encryption/decryption key is specifying within each of said specified classes, permutations that are performed among said binary constructs of said class;

a second group of said specialized functionality, applicable to encryption only, producing one or more levels of encryption hierarchy, comprising:

a first said encryption functionality of fully and uniquely partitioning said IFDS in term of said PS that are defined in accordance to said variable m for said OM bank, by accessing said first partition and recognizing a said PS in said IFDS, and such creating a series of consecutive PS that occur in said IFDS, with every said consecutive PS receiving a first order number alternating as either odd or even with a first PS in said IFDS being odd, and such creating a first level of encryption hierarchy comprising in encrypting said PS in accordance to said specified bank;

a second said encryption functionality of transforming every said consecutive PS immediately as it is said partitioned in accordance to said first encryption functionality, said transforming being into corresponding said RI and said detail by accessing said fourth partition for each said consecutive PS, with said corresponding RI and detail receiving same first order number as said consecutive PS, with said transformation being in accordance to said first read to said second read correspondence of said fourth partition, creating a second level of encryption hierarchy comprising in encrypting said RI and said detail that uses said first level of encryption hierarchy represented by said encrypted PS;

a third said encryption functionality of creating said RI pairs out of said encrypted RI of every two said odd and even consecutive PS in said IFDS immediately as they are said transformed in accordance to said second encryption functionality, with said detail of said two RI in said RI pair creating a detail pair attached to said RI pair and with each detail preserving said first order number, and with said RI pair further accessing said fifth partition in accordance to said first read to said second read correspondence, creating a third level of encryption hierarchy consisting in encrypting said RI pairs that use said second level of encryption represented by said encrypted RI;

a fourth said encryption functionality of assigning to every said RI pair, immediately as it is created by said third encryption functionality, a said RI2 and a said alternative, by accessing said eighth partition for said RI pair, with said RI2 and alternative assignment being in accordance to said first read to said second read correspondence of said eighth partition, creating a fourth level of encryption hierarchy comprising in encrypting said RI2 and said alternatives that use said third level of encryption represented by said encrypted RI pairs;

wherein said minimum size of said IFDS comprising said number of bits of two as said odd and even PS;

a fifth said encryption functionality of generating an output file representing said encrypted IFDS, by writing, immediately as said RI2 and alternative are said assigned in accordance of said fourth encryption functionality, said RI2 and alternative followed by said detail pair, for every said odd and even sequential PS for all said IFDS; and a sixth said encryption functionality comprising calling that an encryption cycle is completed once said output file is generated, writing said implementation ID in said output file, and erasing said OM; and a third group of said specialized functionality, applicable to decryption only, decrypting one or more levels of encryption hierarchy, comprising:

a first said decryption functionality of decrypting said fourth level of encryption hierarchy, comprising:

locating in said output file said RI2 and alternative by accessing said eighth partition in said OM; and decrypting said located RI2 and alternative in accordance to said second read to said first read correspondence of said eighth partition;

a second said decryption functionality of decrypting said third level of encryption hierarchy, comprising:

restoring a said RI pair by accessing said fifth partition in said OM using said decrypted RI2 and alternative;

decrypting said restored RI pair in accordance to said second read to said first read correspondence of said fifth partition; and assigning an odd order number to first RI in said decrypted Ri pair, and an even order number to second RI in said decrypted RI pair;

a third said decryption functionality of decrypting said second level of encryption hierarchy, comprising:

matching said odd number RI in said decrypted RI pair to said odd number detail of said detail pair created during said third encryption functionality by accessing said fourth partition of said OM, and similarly matching said even RI with said even detail; and decrypting said matched odd RI-detail and said even RI-detail in accordance to said second read to said first read correspondence of said second and third partitions, with said decrypted RI and detail preserving said preserving said odd and even numbers; and a fourth said decryption functionality of decrypting said first level of encryption hierarchy and generating said decrypted IFDS, comprising:

restoring every PS In said IFDS in accordance to said variable m represented by said OM bank by matching said odd respectively even decrypted RI-detail with an odd respectively even PS by accessing said first partition;

generating said IFDS by writing in said IFDS every said restored odd respectively even PS, in odd followed by even order, for all said output file; and calling that a decryption cycle is completed once said IFDS is generated, and erasing said OM.

3. A digital system of claim 2, further comprising:

one or more of said hardware blocks are not said self-contained within said digital system, comprising:

said first hardware block is allocated within a data storage device of said hardware system;

said second hardware block is allocated within a data storage device of said hardware system; and said third hardware block with its-said specialized functionality is fully or partly implemented by a hardware processor of broad functionality within said hardware system, that can perform said specialized functionality by following a series of software instructions.

4. A digital system of claim 2 designed to only encrypt data, wherein said third group of said specialized functionality, applicable to decryption only, is not supported.

5. A digital system of claim 2 designed to only decrypt data, wherein said second group of said specialized functionality, applicable to encryption only, is not supported.

6. A digital system of claim 2 wherein said third hardware block is a hardware processor that is capable to perform said specialized functionality by following a series of software instructions.

7. A digital system of claim 2, further comprising:

said encryption/decryption key consists of a total number of bits, comprising:
- a first number of bits to specify a said value of said variable m, i.e. to specify a said bank that is copied from said SAM into said OM, and used for encryption/decryption;
- a second number of bits to specify one or more of said sets that are being modified within said OM bank;
- a third number of bits to specify one or more of said classes that are being modified within each of said specified sets; and
- a fourth number of bits to specify within each of said specified classes, permutations that are performed among said binary constructs of said class.

8. A digital system of claim 7, wherein the encryption/decryption key further comprises:

a fifth number of bits, to specify if said one or more of said classes specified by said third number of bits are permutated as specified by said fourth number of bits, or if said binary constructs of two or more up to all of said classes specified by said third number of bits are merged into one group and permutated together as specified by a sixth number of bits.

9. A digital system of claim 8, wherein said first encryption/decryption functionality of writing said OM, further comprising:

copying said bank indicated by said first number of bits of said encryption/decryption key from said SAM into said OM;

when said binary constructs of two or more up to all of said classes specified by said third number of bits are merged into one group as specified by said fifth number of bits and permutated together as specified by said sixth number of bits, modifying said OM comprising:
- reading all said binary constructs of all said two or more up to all classes indicated by said encryption/decryption key, merging them in said group, and creating an order log of said storage locations of each said binary construct in said read;
- applying permutations among said read binary constructs of said group, as Indicated by said sixth number of bits of said encryption/decryption key; and
- writing said permutated binary constructs of said group back in said OM at same storage locations as in said storage location order log, such that when same storage location of a specific said binary construct of a said two or more up to all classes is read from said SAM called first read and from said OM called second read, a said first read to a said second read correspondence is the encryption of said specific binary construct, and a said second read to a said first read correspondence is the decryption of said specific binary construct.

10. A digital system of claim 7, wherein said first encryption/decryption functionality of writing said OM, further comprising:

copying said bank indicated by said first number of bits of said encryption/decryption key from said SAM into said OM;

modifying one or more of said second partition, third partition, fifth partition, sixth partition, seventh partition, in said OM, as indicated by said second number of bits of said encryption/decryption key;

when said second number of bits indicate that said second partition is being modified:
- for each of said RI classes indicated by said third number of bits of said encryption/decryption key, reading said RI and creating an order log of said storage locations of each said RI in said read;
- applying permutations among said RI of each of said read RI class as indicated by said fourth number of bits of said encryption/decryption key;
- writing said permutated RI of each said RI class back in said OM at same storage locations as in said storage location order log, such that when same storage location of a specific said RI of a said RI class is read from said SAM called first read and from said OM called second read, a said first read to a said second read correspondence is the encryption of said specific RI, and a said second read to a said first read correspondence is the decryption of said specific RI; and
- updating all said RI of each said RI class from said fourth partition in accordance to said first read to second read correspondence of said second partition;

when said second number of bits indicate that said third partition is being modified:
- for each of said detail classes indicated by said third number of bits of said encryption/decryption key, reading said detail and creating an order log of storage locations of each said detail in said read;
- applying permutations among said detail of each of said read detail class as indicated by said fourth number of bits of said encryption/decryption key;
- writing said permutated detail of each said detail class back in said OM at same storage locations as in said storage location order log, such that when same storage location of a specific said detail of a said detail class is read from said SAM called first read and from said OM called second read, a said first read to a said second read correspondence is the encryption of said specific detail, and a said second read to a said first read correspondence is the decryption of said specific detail; and
- updating all said detail of each said detail class from said fourth partition in accordance to said first read to second read correspondence of said third partition;

when said second number of bits indicate that said fifth partition is being modified:
- for each of said RI pair classes indicated by said third number of bits of said encryption/decryption key, reading said RI pair and creating an order log of said storage locations of each said RI pair in said read, applying permutations among said RI pair of each of said read RI pair class as indicated by said fourth number of bits of said encryption/decryption key; and writing said permutated RI pair of each said RI pair class back in said OM at same storage locations as in said storage location order log, such that when same storage location of a specific said RI pair of a said RI pair class is read from said SAM called first read and from said OM called second read, a said first read to a said second read correspondence is the encryption of said specific RI pair, and a said second read to a said first read correspondence is the decryption of said specific RI pair;

when said second number of bits indicate that said sixth partition is being modified:

for each of said RI2 classes indicated by said third number of bits of said encryption/decryption key, reading said RI2 and creating an order log of said storage locations of each said RI2 in said read;

applying permutations among said RI2 of each of said read RI2 class as indicated by said fourth number of bits of said encryption/decryption key;

writing said permutated RI2 of each said RI2 class back in said OM at same storage locations as in said storage location order log, such that when same storage location of a specific said RI2 of a said RI2 class is read from said SAM called first read and from said OM called second read, a said first read to a said second read correspondence is the encryption of said specific RI2, and a said second read to a said first read correspondence is the decryption of said specific RI2; and updating all said RI2 of each said RI2 class from said eighth partition in accordance to said first read to second read correspondence of said sixth partition;

when said second number of bits indicate that said seventh partition is being modified:

for each of said alternative classes indicated by said third number of bits of said encryption/decryption key, reading said alternatives and creating an order log of said storage locations of each said alternative in said read;

applying permutations among said alternatives of each of said read alternatives class as indicated by said fourth number of bits of said encryption/decryption key;

writing said permutated alternatives of each said alternative class back in said OM at same storage locations as in said storage location order log, such that when same storage location of a specific said alternative of a said alternatives class is read from said SAM called first read and from said OM called second read, a said first read to a said second read correspondence is the encryption of said specific alternative, and a said second read to a said first read correspondence is the decryption of said specific alternative; and updating all said alternatives of each said alternatives class from said eighth partition in accordance to said first read to second read correspondence of said seventh partition.

11. A first and a second digital system of claim 2, further comprising:

said first digital system has a first said implementation ID and said second digital system has a second said implementation ID;

said first digital system is encrypting data for said second digital system and said second digital system is decrypting data encrypted by said first digital system;

said first digital system and said second digital system are sharing said encryption/decryption key in-between them by using one of the following approaches, comprising:

a first said approach, comprising:

performing specialized functionality by said specialized controller of said first digital system, comprising:

writing, at said completion of said encryption cycle, said encryption/decryption key in said output file through a seventh said encryption functionality;

performing specialized functionality by said specialized controller of said second digital system, comprising:

retrieving said encryption/decryption key from said output file through a fifth said decryption functionality;

a second said approach, comprising:

implementing in each of said digital systems a fourth said hardware block, as an encryption/decryption keys memory (KM), to store a number of said encryption/decryption keys, with one or more said encryption/decryption keys being assigned and dedicated to be used to exchange said encrypted data between every two specific digital systems only, i.e., said first digital system is storing in its said KM one or more said encryption/decryption keys assigned and dedicated to be used to exchange said encrypted data with said second digital system only, and said second digital system is storing in its KM same one or more encryption/decryption keys assigned and dedicated to be used to exchange said encrypted data with said first digital system only;

performing specialized functionality by said specialized controller of said first digital system, comprising:

receiving from said second digital system said second implementation ID through a second said encryption/decryption functionality;

retrieving a said encryption/decryption key that is dedicated for said second implementation ID from its KM, through a third said encryption/decryption functionality;

encrypting said IFDS using said retrieved encryption/decryption key;

transmitting said output file to said second digital system through a fourth said encryption/decryption functionality;

performing specialized functionality by said specialized controller of said second digital system, comprising:

receiving said output file from said first digital system through said second encryption/decryption functionality;

retrieving said first implementation ID from said output file through said second encryption/decryption functionality;

retrieving a said encryption/decryption key that is dedicated for said first implementation ID from its KM through said third encryption/decryption functionality;

decrypting said output file by using said retrieved encryption/decryption key;

a third said approach, comprising:

additionally encrypting said encryption/decryption key for said first approach, respectively said implementation IDs for said second approach, through an eighth said encryption functionality, with said additional encryption being performed using an additional encryption/decryption key that is chosen by using information comprising:

time at which said data exchange starts;

outside temperature at said first digital system; and other Information that can be derived by both said first digital system and said second digital system without any further data exchange.

* * * * *